US011716137B2

(12) United States Patent
Radulescu et al.

(10) Patent No.: US 11,716,137 B2
(45) Date of Patent: *Aug. 1, 2023

(54) TERRESTRIAL WIRELESS POSITIONING IN LICENSED AND UNLICENSED FREQUENCY BANDS

(71) Applicant: QUALCOMM Incorporated, San Diego, CA (US)

(72) Inventors: Andrei Dragos Radulescu, San Diego, CA (US); Hem Agnihotri, Benares (IN); Stephen William Edge, Escondido, CA (US); Sven Fischer, Nuremberg (DE); Bapineedu Chowdary Gummadi, Hyderabad (IN); Venkata A Naidu Babbadi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 17/118,401

(22) Filed: Dec. 10, 2020

(65) Prior Publication Data

US 2021/0091851 A1 Mar. 25, 2021

Related U.S. Application Data

(63) Continuation of application No. 16/586,766, filed on Sep. 27, 2019, now Pat. No. 10,887,005, which is a
(Continued)

(51) Int. Cl.
*H04B 7/26* (2006.01)
*H04W 16/16* (2009.01)
*H04W 64/00* (2009.01)

(52) U.S. Cl.
CPC ......... *H04B 7/2634* (2013.01); *H04B 7/2637* (2013.01); *H04W 16/16* (2013.01); *H04W 64/003* (2013.01)

(58) Field of Classification Search
CPC ...... H04W 16/14; H04W 64/00; H04L 5/0048
See application file for complete search history.

(56) References Cited

U.S. PATENT DOCUMENTS 10,396,883 B2    8/2019  Radulescu et al.
10,461,847 B2 *  10/2019 Radulescu .......... H04W 64/006
(Continued)

FOREIGN PATENT DOCUMENTS

WO    2016029826 A1    3/2016
WO    2016054969 A1    4/2016
(Continued)

*Primary Examiner* — Ross Varndell
(74) *Attorney, Agent, or Firm* — Muncy, Geissler, Olds & Lowe, P.C.

(57) ABSTRACT

Disclosed are techniques for determining a distance (or range) between a first wireless entity and a second wireless entity. In an aspect, the first wireless entity transmits a first positioning reference signaling (PRS) signal to the second wireless entity at a first time, where the first PRS signal is received by the second wireless entity at a second time, and receives a second PRS signal from the second wireless entity at a third time, where the second PRS signal is transmitted by the second wireless entity at a fourth time. The first wireless entity enables the distance to be determined by a location computing entity, for example, by a location server, based on the first, second, third, and fourth times. The first wireless entity may be a mobile device or a base station and the second wireless entity may be the other of the mobile device or base station.

30 Claims, 10 Drawing Sheets

Related U.S. Application Data continuation of application No. 15/607,409, filed on May 26, 2017, now Pat. No. 10,461,847.

(56)     References Cited

U.S. PATENT DOCUMENTS

| | | |
|---|---|---|
| 10,887,005 B2 * | 1/2021 | Radulescu .......... H04W 64/006 |
| 2001/0046869 A1 | 11/2001 | Cedervall et al. |
| 2008/0318596 A1 | 12/2008 | Tenny |
| 2010/0234043 A1 | 9/2010 | Wigren et al. |
| 2011/0059752 A1 | 3/2011 | Garin et al. |
| 2014/0148093 A1 | 5/2014 | Nguyen et al. |
| 2015/0263837 A1 | 9/2015 | Patel et al. |
| 2015/0296359 A1 | 10/2015 | Edge |
| 2016/0142994 A1 | 5/2016 | Luo et al. |
| 2016/0223641 A1 * | 8/2016 | Cheng ................... G01S 5/0036 |
| 2016/0345229 A1 | 11/2016 | Das et al. |
| 2016/0366594 A1 | 12/2016 | Chang et al. |
| 2017/0280331 A1 | 9/2017 | Gou et al. |
| 2017/0353866 A1 | 12/2017 | Gou et al. |
| 2018/0063678 A1 | 3/2018 | Zhu et al. |
| 2018/0343048 A1 | 11/2018 | Radulescu et al. |
| 2018/0343056 A1 | 11/2018 | Radulescu et al. |
| 2020/0028583 A1 | 1/2020 | Radulescu et al. |

FOREIGN PATENT DOCUMENTS

| | | |
|---|---|---|
| WO | 2016176845 A1 | 11/2016 |
| WO | 2016181197 A1 | 11/2016 |
| WO | 2016181198 A1 | 11/2016 |

* cited by examiner

LTE EXAMPLE

TERRESTRIAL WIRELESS POSITIONING IN LICENSED AND UNLICENSED FREQUENCY BANDS

CROSS-REFERENCE TO RELATED APPLICATIONS FOR PATENT

The present application for patent is a continuation of U.S. patent application Ser. No. 16/586,766, entitled "TERRESTRIAL WIRELESS POSITIONING IN LICENSED AND UNLICENSED FREQUENCY BANDS," filed Sep. 27, 2019, which is a continuation of U.S. patent application Ser. No. 15/607,409, entitled "TERRESTRIAL WIRELESS POSITIONING IN LICENSED AND UNLICENSED FREQUENCY BANDS," filed May 26, 2017, each of which is assigned to the assignee hereof, and expressly incorporated herein by reference in its entirety.

BACKGROUND OF THE DISCLOSURE

1. Field of the Disclosure

Aspects of the disclosure relate to positioning of a user equipment (UE) that has access to a terrestrial wireless network using a licensed or unlicensed frequency band.

2. Description of the Related Art

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system.

Positioning of a UE with access to a wireless network employing licensed or unlicensed spectrum (e.g., an LTE network using licensed spectrum or an LTE Unlicensed (LTE-U) network) may be beneficial or even critical to support certain applications, such as emergency calls, personal navigation, direction finding, person finding, asset tracking, etc. However, current state of art positioning may have limited accuracy and/or excessive response time in certain environments (e.g., indoors) and/or using certain types of networks (e.g., private LTE-U networks). Improvements in positioning support for such environments and/or networks may be desirable.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method at a first wireless entity for determining a distance to a second wireless entity includes transmitting a first positioning reference signaling (PRS) signal to the second wireless entity at a first time, wherein the first PRS signal is received by the second wireless entity at a second time, receiving a second PRS signal from the second wireless entity at a third time, wherein the second PRS signal is transmitted by the second wireless entity at a fourth time, and enabling the distance to be determined by a location computing entity based on the first time, the second time, the third time, and the fourth time.

In an aspect, an apparatus for determining a distance from a first wireless entity to a second wireless entity includes a transceiver of the first wireless entity configured to: transmit a first PRS signal to the second wireless entity at a first time, wherein the first PRS signal is received by the second wireless entity at a second time, and receive a second PRS signal from the second wireless entity at a third time, wherein the second PRS signal is transmitted by the second wireless entity at a fourth time, and at least one processor of the first wireless entity configured to: enable the distance to be determined by a location computing entity based on the first time, the second time, the third time, and the fourth time.

In an aspect, a non-transitory computer-readable medium storing computer-executable instructions for determining a distance from a first wireless entity to a second wireless entity includes computer-executable instructions comprising at least one instruction to cause the first wireless entity to transmit a first PRS signal to the second wireless entity at a first time, wherein the first PRS signal is received by the second wireless entity at a second time, at least one instruction to cause the first wireless entity to receive a second PRS signal from the second wireless entity at a third time, wherein the second PRS signal is transmitted by the second wireless entity at a fourth time, and at least one instruction to cause the first wireless entity to enable the distance to be determined by a location computing entity based on the first time, the second time, the third time, and the fourth time.

In an aspect, an apparatus for determining a distance from a first wireless entity to a second wireless entity includes a communication means of the first wireless entity configured to: transmit a first PRS signal to the second wireless entity at a first time, wherein the first PRS signal is received by the second wireless entity at a second time, and receive a second PRS signal from the second wireless entity at a third time, wherein the second PRS signal is transmitted by the second wireless entity at a fourth time, and a processing means of the first wireless entity configured to: enable the distance to be determined by a location computing entity based on the first time, the second time, the third time, and the fourth time.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
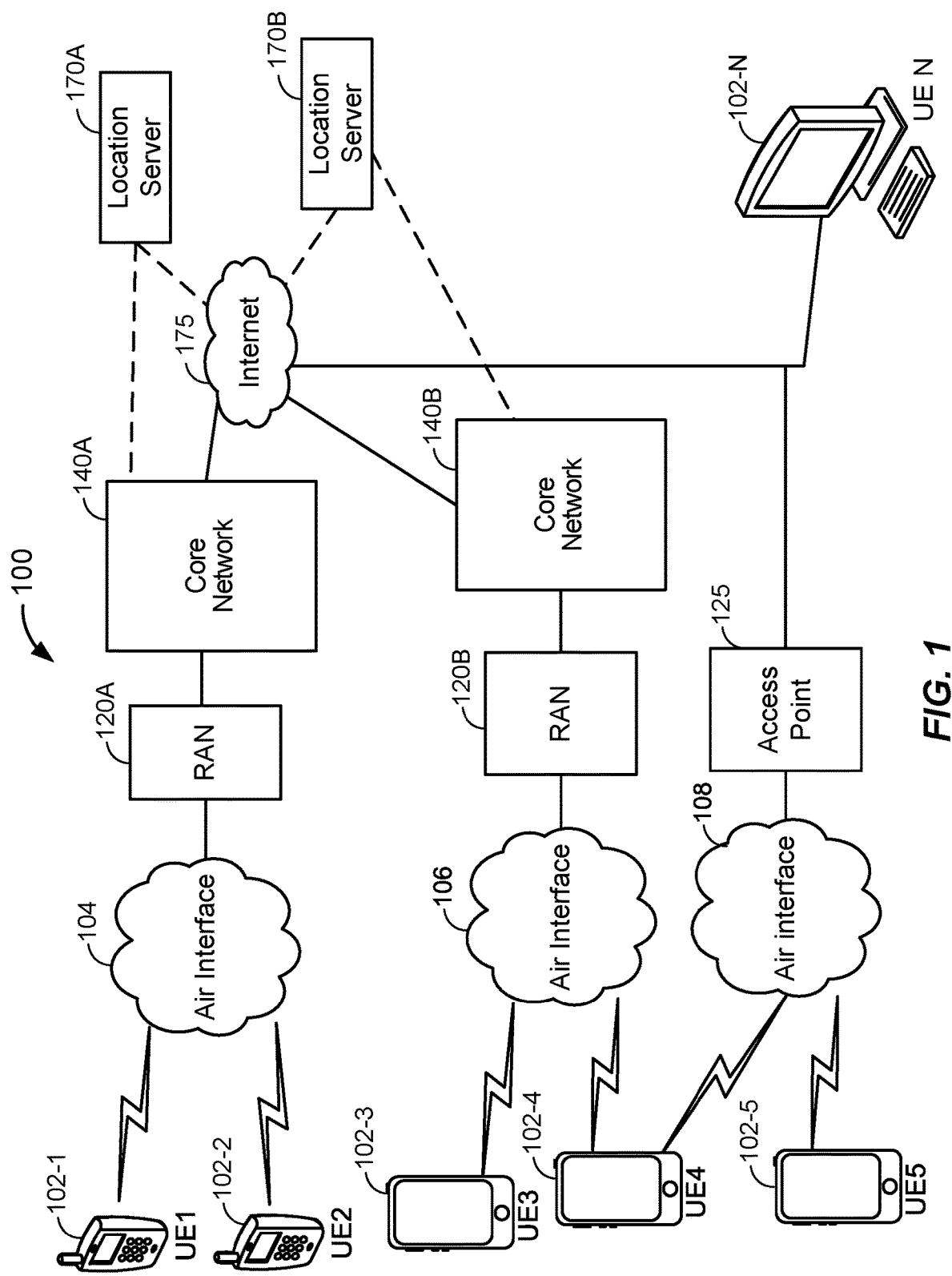
FIG. 1 illustrates a high-level system architecture of a wireless communications system in accordance with an aspect of the disclosure.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 102-1, 102-2, 102-3, 102-4, 102-5, and 102-N of a UE are shown in FIG. 1. A reference to a UE 102 then refers to any of UEs 102-1, 102-2, 102-3, 102-4, 102-5, and 102-N. Likewise, in FIG. 1, any reference to a location server 170 can refer to either location server 170A or location server 170B in FIG. 1.

DETAILED DESCRIPTION

Disclosed are techniques for determining a distance (or range) between a pair of wireless entities (e.g., a UE and eNodeB). Also disclosed are techniques for positioning of a UE at a location server based on measurements of signal propagation time and timing differences between signals received at the UE from two or more pairs of base stations.

These techniques and other aspects are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer-readable storage medium having stored therein a corresponding set of computer instructions that, upon execution, would cause or instruct an associated processor of a device to perform the functionality described herein, such as the functionality described with reference to FIGS. 6 and 7. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A mobile device, also referred to herein as a UE, may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an aspect of the disclosure. The wireless communications system 100 contains UEs 1 to N (referenced as 102-1 to 102-N). The UEs 102-1 to 102-N can include cellular telephones, personal digital assistant (PDAs), pagers, a laptop computer, a tablet computer, a desktop computer, and so on. For example, in FIG. 1, UE 102-1 and UE 102-2 are illustrated as cellular feature phones, UEs 102-3, 102-4, and 102-5 are illustrated as cellular touchscreen phones, or "smartphones," and UE 102-N is illustrated as a desktop computer, or personal computer (often referred to as a "PC"). Although only six UEs 102 are shown in FIG. 1, the number of UEs 102 in wireless communications system 100 may be in the hundreds, thousands, or millions (e.g., N may be any number up to or greater than one million).

Referring to FIG. 1, UEs 102-1 to 102-N are configured to communicate with one or more access networks (e.g., the RANs 120A and 120B, the access point 125, etc.) over a physical communications interface or layer, shown in FIG. 1 as air interfaces 104, 106, and 108 and/or a direct wired connection. The air interfaces 104 and 106 can comply with a given cellular communications protocol (e.g., Code Division Multiple Access (CDMA), Evolution-Data Optimized (E-VDO), Enhanced High Rate Packet Data (eHRPD), Global System for Mobile communications (GSM), Wideband CDMA (W-CDMA), LTE, LTE-U, etc.), while the air interface 108 can comply with a Wireless Local Area Network (WLAN) protocol (e.g., IEEE 802.11). Both RAN 120A and 120B may include a plurality of access points that serve UEs over air interfaces, such as the air interfaces 104 and 106. The access points in the RAN 120A and 120B can be referred to as access nodes (ANs), access points (APs), base stations (BSs), Node Bs, eNodeBs, and so on. For example, an eNodeB (also referred to as an evolved NodeB) is typically a base station that supports wireless access by UEs 102 according to the LTE wireless interface defined by 3GPP. These access points can be terrestrial access points (or ground stations), or satellite access points.

Both RANs 120A and 120B are configured to connect to a core network 140A and 140B, respectively, that can perform a variety of functions, including routing and connecting circuit switched (CS) calls between UEs 102 served by the RAN 120A/120B and other UEs 102 served by the RAN 120A/120B or UEs served by a different RAN altogether, and can also mediate an exchange of packet-switched (PS) data with external networks such as Internet 175 and external clients and servers.

The Internet 175 includes a number of routing agents and processing agents (not shown in FIG. 1 for the sake of convenience). In FIG. 1, UE 102-N is shown as connecting to the Internet 175 directly (i.e., separate from the core networks 140A and 140B, such as over an Ethernet connection of WiFi or 802.11-based network). The Internet 175 can thereby function to route and connect packet-switched data communications between UE 102-N and UEs 102-1 to 102-5 via the core network 140A/140B.

Also shown in FIG. 1 is the access point 125 that is separate from the RANs 120A and 120B. The access point 125 may be connected to the Internet 175 independently of the core networks 140A and 140B (e.g., via an optical communication system such as FiOS, a cable modem, etc.). The air interface 108 may serve UE 102-4 or UE 102-5 over a local wireless connection, such as IEEE 802.11 in an example. UE 102-N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, location servers 170A and 170B are shown as connected to the Internet 175, the core networks 140A and 140B, respectively, or both. The location servers 170A and 170B can each be implemented as a plurality of structurally separate servers, or alternately may each correspond to a single server. As will be described below in more detail, the location servers 170A and 170B are configured to support one or more location services for UEs 102 that can connect to the location servers 170A and 170B via the core networks 140A and 140B, respectively, and/or via the Internet 175.

An example of a protocol-specific implementation for the RANs 120A and 120B and the core networks 140A and 140B are provided below with respect to FIG. 2 to help explain the wireless communications system 100 in more detail. In particular, the components of the RANs 120A and 120B and the core networks 140A and 140B correspond to components associated with supporting packet-switched (PS) communications, whereby legacy circuit-switched (CS) components may also be present in these networks, but any legacy CS-specific components are not shown explicitly in FIG. 2.

Figure 2:
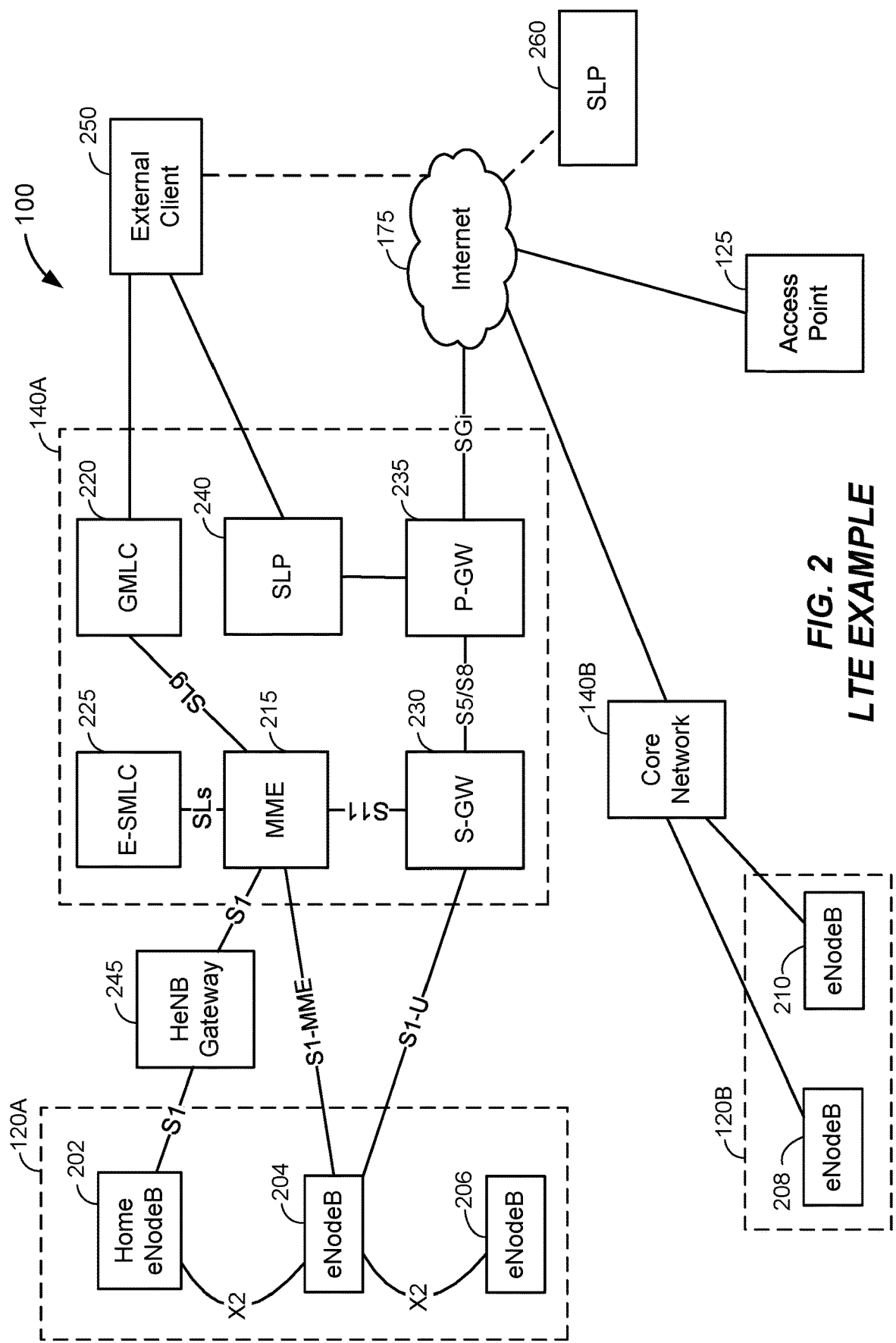
FIG. 2 illustrates an example configuration of radio access networks (RANs) and a packet-switched portion of a core network that is based on an LTE network in accordance with an aspect of the disclosure.

FIG. 2 illustrates an example configuration of a portion of the RANs 120A and 120B and a portion of the core network 140A based on an LTE or LTE-U network, in accordance with an aspect of the disclosure. Referring to FIG. 2, RAN 120A is configured with a plurality of evolved Node Bs (also referred to as eNodeBs or eNBs) 202, 204 and 206, and RAN 120B is configured with a plurality of eNodeBs 208 and 210. The eNodeBs 202 to 210 may be configured to broadcast a Positioning Reference Signal (PRS) to nearby UEs 102 to enable any UE 102 to make measurements of PRS timing differences between pairs of eNodeBs. The PRS timing difference measurements may enable a location estimate of the UE 102 to be obtained, according to the Observed Time Difference of Arrival (OTDOA) positioning method, either by the UE 102 itself (e.g., if the UE 102 is provided with location coordinates and timing information for the measured eNodeBs by a location server) or by a location server (e.g., a location server 170) to which the PRS timing difference measurements may be sent. OTDOA is a multilateration method in which the UE 102 measures the time difference, known as a Reference Signal Time Difference (RSTD), between specific signals (e.g., PRS signals) from different pairs of eNodeBs and either reports the RSTD measurements to a location server or computes a location itself from the RSTD measurements.

In the example of FIG. 2, eNodeB 202 is shown as a Home eNodeB (HeNB) and interfaces with the RAN 120A via a HeNB gateway 245. The Home eNodeB 202 is an example of a "small cell base station." The term "small cell" generally refers to a class of low-powered access points that may include or be otherwise referred to as femto cells, pico cells, micro cells, home base stations, Wi-Fi APs, other small coverage area APs, etc. A small cell may be deployed to supplement macro cell coverage and/or increase network capacity. A small cell may provide wireless coverage indoors such as within a house, office, a portion of a large building, a portion of a convention center, shopping mall, etc. A small cell may instead or in addition provide wireless coverage outdoors such as over an area covering part of a block or a few blocks within a neighborhood. Small cells may communicate using unlicensed frequency bands, as opposed to macro cells, which may typically communicate using licensed frequency bands.

In FIG. 2, the core network 140A includes an Enhanced Serving Mobile Location Center (E-SMLC) 225, a Mobility Management Entity (MME) 215, a Gateway Mobile Location Center (GMLC) 220, a Serving Gateway (S-GW) 230, a Packet Data Network Gateway (P-GW) 235, and a Secure User Plane Location (SUPL) Location Platform (SLP) 240. Although not illustrated in FIG. 2 for the sake of simplicity, core network 140B may include the same or similar network entities. In the example of FIG. 2, the location server 170A in FIG. 1 may correspond to one or more of the E-SMLC 225, the GMLC 220, or the SLP 240. Additionally, the location server 170B in FIG. 1 may correspond to the SLP 260.

Network interfaces between the components of the core network 140A, the RAN 120A, and the Internet 175 are illustrated in FIG. 2 and are defined in Table 1 (below) as follows:

TABLE 1

LTE Core Network Connection Definitions

| Network Interface | Description |
|---|---|
| S1-MME | Reference point for the control plane protocol between RAN 120A and MME 215. |
| S1-U | Reference point between RAN 120A and S-GW 230 for the per bearer user plane tunneling and inter-eNodeB path switching during handover. |
| S5 | Provides user plane tunneling and tunnel management between S-GW 230 and P-GW 235. It is used for S-GW relocation due to UE mobility and if the S-GW 230 needs to connect to a non-collocated P-GW for the required PDN connectivity. |
| S8 | Inter-PLMN reference point providing user and control plane between the S-GW 230 in a Visited Public Land Mobile Network (VPLMN) and the P-GW 235 in a Home Public Land Mobile Network (HPLMN). S8 is the inter-PLMN variant of S5. P-GW 235 is shown as being in the same Public Land Mobile Network (PLMN) as S-GW 230 in FIG. 2 so only the S5 interface may apply in FIG. 2. But the S8 interface would apply if P-GW 235 was located in a different PLMN (e.g., Core Network 140B). |
| S11 | Reference point between MME 215 and S-GW 230. |
| SGi | Reference point between the P-GW 235 and a packet data network (PDN), shown in FIG. 2 as the Internet 175. The PDN may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |

A high-level description of some of the components shown in the RANs 120A and 120B and the core network 140A of FIG. 2 is now provided. However, these components are each well-known in the art from various 3GPP and Open Mobile Alliance (OMA) Technical Specifications (TSs), and the description contained herein is not intended to be an exhaustive description of all functionalities performed by these components.

Referring to FIG. 2, the MME 215 is configured to manage the control plane signaling for the Evolved Packet System (EPS). MME functions include: Non-Access Stratum (NAS) signaling, NAS signaling security, Mobility management for UEs 102 including support for inter-RAN and intra-RAN handovers, P-GW and S-GW selection, and MME selection for handovers with a change of MME.

The S-GW 230 is the gateway that terminates the interface toward the RAN 120A. For each UE 102 attached to the core network 140A for an LTE-based system, at a given point of time, there can be a single S-GW 230. The functions of the S-GW 230 include: serving as a mobility anchor point, packet routing and forwarding, and setting the Differentiated Services Code Point (DSCP) based on a Quality of Service (QoS) Class Identifier (QCI) of an associated EPS bearer.

The P-GW 235 is the gateway that terminates the SGi interface toward the Packet Data Network (PDN), e.g., the Internet 175. If a UE 102 is accessing multiple PDNs, there may be more than one P-GW 235 for that UE 102. P-GW 235 functions include: providing PDN connectivity to UEs 102, UE IP address allocation, setting the DSCP based on the QCI of the associated EPS bearer, accounting for inter operator charging, uplink (UL) and downlink (DL) bearer binding, and UL bearer binding verification.

As further illustrated in FIG. 2, an external client 250 may be connected to the core network 140A via the GMLC 220 and/or the SLP 240. The external client 250 may optionally be connected to the core network 140A, the core network 140B and/or the SLP 260 via the Internet 175. The external client 250 may be a server, a web server, or a user device, such as a personal computer, a UE, etc.

The HeNB Gateway 245 in FIG. 2 may be used to support connection of small cells and/or HeNBs, such as HeNB 202. HeNB Gateway 245 may include or be connected to a Security Gateway (not shown in FIG. 2). The Security Gateway may help authenticate the small cells and/or HeNBs, such as HeNB 202, and/or may enable secure communication between the small cells and/or HeNBs, such as HeNB 202, and other network entities, such as MME 215. The HeNB Gateway 245 may perform protocol relaying and conversion in order to allow small cells and/or HeNBs, such as HeNB 202, to communicate with other entities, such as MME 215.

The E-SMLC 225 may be a location server that supports a control plane location solution enabling a location of a UE 102 with LTE or LTE-U radio access to be obtained. With a control plane (CP) location solution, the signaling used to initiate positioning of a UE 102 and the signaling related to the positioning of the UE 102 can occur over interfaces of a cellular network and using protocols that support signaling (as opposed to data or voice transfer). The functions of the E-SMLC 225 may include: (i) managing a location session to determine a location of a UE 102; (ii) initiating one or more position methods to obtain location related measurements for a UE 102 (e.g., from the UE 102 and/or from eNodeBs 202-206 in RAN 120A); and/or (iii) providing assistance data to a UE 102 to enable the UE 102 to obtain location related measurements and/or determine a location estimate for the UE 102 from such location related measurements. The E-SMLC 225 may be accessed by the MME 215, which may transfer a location request for a UE 102 received from GMLC 220 to E-SMLC 225 and return any location estimate determined by the E-SMLC 225 back to the GMLC 220.

The GMLC 220 may be a location server that enables an external client, such as external 250, to request and obtain a location estimate for a UE 102. Functions of the GMLC 220 may include authenticating and authorizing an external client 250 and requesting and obtaining a location estimate for a UE 102 from the MME 215 on behalf of the external client 250.

The SLP 240 and SLP 260 may support the Secure User Plane Location (SUPL) location solution defined by the OMA, which is a user plane (UP) location solution. With a UP location solution, signaling to initiate and perform positioning of a UE 102 may be transferred using interfaces and protocols that support transfer of data (and possibly voice and other media). With the SUPL UP location solution, the location server may include or take the form of a SUPL Location Platform (SLP), such as SLP 240 or SLP 260. In FIG. 2, either or both of SLPs 240 and 260 may be a Home SLP (H-SLP) for one or more of UEs 102, an emergency SLP (E-SLP), and/or a Discovered SLP (D-SLP). The functions of the SLPs 240 and 260 may include some or all of the functions described previously for both the E-SMLC 225 and the GMLC 220.

In order to support location of a UE 102, the E-SMLC 225, SLP 240, and SLP 260 may support one or more positioning protocols, such as the LTE Positioning Protocol (LPP) defined by 3GPP or the LPP extensions (LPPe) protocol defined by OMA. A positioning protocol may be used between a UE 102 and a location server 170, such as the E-SMLC 225, SLP 240, or SLP 260, to coordinate and control position determination for a UE 102. The positioning protocol may define: (a) positioning related procedures that may be executed by the location server 170 and/or the UE 102; and/or (b) communication or signaling exchanged between the UE 102 and the location server 170 related to positioning of the UE 102. For control plane location, the E-SMLC 225 may use a positioning protocol, such as the LPP A protocol (LPPa) defined by 3GPP, to obtain location related information for a UE 102 from elements in the RAN 120A, such as any of eNodeBs 202-206. The location related information that is obtained may include location related measurements for the UE 102 or other information to assist location of the UE 102, such as information on PRS signals transmitted by one or more of eNodeBs 202-206 or location coordinates of one or more of eNodeBs 202-206. LPP is well-known and described in various publicly available technical specifications (TSs) from 3GPP (e.g., 3GPP TS 36.355). LPPe has been defined by the OMA (e.g., in OMA TS OMA-TS-LPPe-V1_0) and may be used in combination with LPP such that an LPP message may contain an embedded LPPe message in a combined LPP/LPPe message. LPPa is described in 3GPP TS 36.455.

A location estimate (e.g., for a UE 102) may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 3:
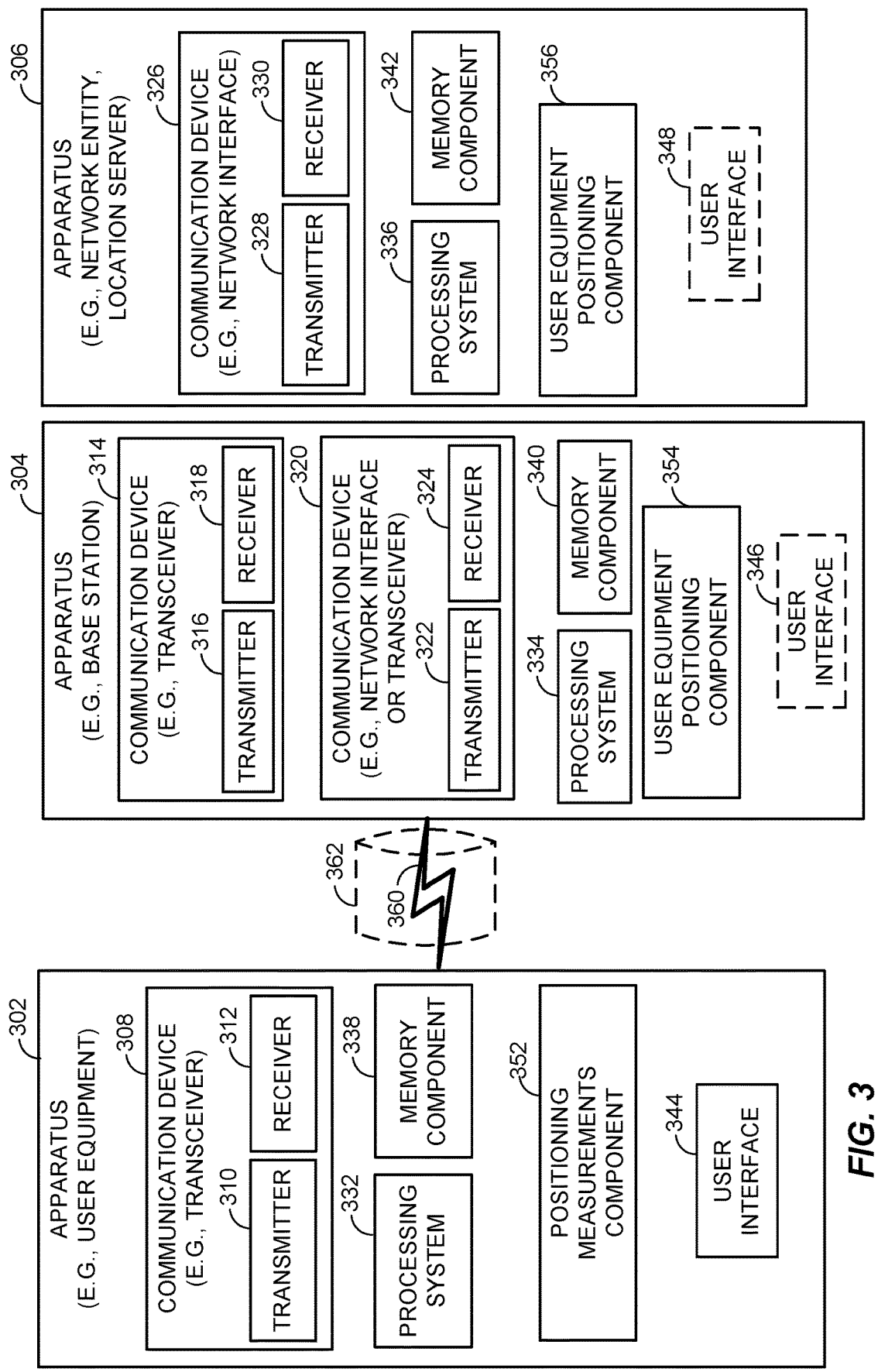
FIG. 3 is a simplified block diagram of several sample aspects of components that may be employed in wireless communication nodes and configured to support communication as taught herein.

FIG. 3 illustrates several sample components (represented by corresponding blocks) that may be incorporated into an apparatus 302, an apparatus 304, and an apparatus 306 (corresponding to, for example, a UE, a base station (e.g., an eNodeB), and a network entity or location server, respectively) to support the operations as disclosed herein. As an example, the apparatus 302 may correspond to a UE 102, the apparatus 304 may correspond to any of eNodeBs 202-210, and the apparatus 306 may correspond to the E-SMLC 225, SLP 240, SLP 260, or GMLC 220. It will be appreciated that the components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 302 and the apparatus 304 each include at least one wireless communication device (represented by the communication devices 308 and 314) for communicating with other nodes via at least one designated radio access technology (RAT) (e.g., LTE). Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). For example, transmitter 310 may be used to transmit an uplink PRS signal to assist location of the apparatus 302 according to techniques described herein. Similarly, each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 304 may also comprise a Network Listen Module (NLM) or the like for performing various measurements.

The apparatus 304 and the apparatus 306 include at least one communication device (represented by the communication device 320 and the communication device 326) for communicating with other nodes. For example, the communication device 326 may comprise a network interface that is configured to communicate with one or more network entities via a wire-based or wireless backhaul connection. In some aspects, the communication device 326 may be implemented as a transceiver configured to support wire-based or wireless signal communication. This communication may involve, for example, sending and receiving: messages, parameters, or other types of information. Accordingly, in the example of FIG. 3, the communication device 326 is shown as comprising a transmitter 328 and a receiver 330. Similarly, the communication device 320 may comprise a network interface that is configured to communicate with one or more network entities via a wire-based or wireless backhaul. As with the communication device 326, the communication device 320 is shown as comprising a transmitter 322 and a receiver 324.

The apparatuses 302, 304, and 306 also include other components that may be used in conjunction with the operations as disclosed herein. The apparatus 302 includes a processing system 332 for providing functionality relating to, for example, positioning reference signaling (PRS) support and/or propagation time measurement in a licensed or unlicensed frequency band as disclosed herein and for providing other processing functionality. The apparatus 304 includes a processing system 334 for providing functionality relating to, for example, PRS support and/or propagation time measurement in a licensed or unlicensed frequency band as disclosed herein and for providing other processing functionality. The apparatus 306 includes a processing system 336 for providing functionality relating to, for example, PRS support and/or propagation time measurement in a licensed or unlicensed frequency band as disclosed herein and for providing other processing functionality.

The apparatuses 302, 304, and 306 include memory components 338, 340, and 342 (e.g., each including a memory device), respectively, for maintaining information (e.g., information indicative of reserved resources, thresholds, parameters, and so on). In addition, the apparatuses 302, 304, and 306 include user interface devices 344, 346, and 348, respectively, for providing indications (e.g., audible and/or visual indications) to a user and/or for receiving user input (e.g., upon user actuation of a sensing device such a keypad, a touch screen, a microphone, and so on).

For convenience, the apparatuses 302, 304, and/or 306 are shown in FIG. 3 as including various components that may be configured according to the various examples described herein. It will be appreciated, however, that the illustrated blocks may have different functionality in different designs.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, and 344 may be implemented by processor and memory component(s) of the apparatus 302 (e.g., by execution of appropriate code and/or by appropriate configuration of processor components). Similarly, some or all of the functionality represented by blocks 314, 320, 334, 340, and 346 may be implemented by processor and memory component(s) of the apparatus 304 (e.g., by execution of appropriate code and/or by appropriate configuration of processor components). Also, some or all of the functionality represented by blocks 326, 336, 342, and 348 may be implemented by processor and memory component(s) of the apparatus 306 (e.g., by execution of appropriate code and/or by appropriate configuration of processor components).

In an aspect, the apparatus 304 may correspond to a "small cell" or a Home eNodeB, such as Home eNodeB 202 in FIG. 2. The apparatus 302 may transmit and receive messages via a wireless link 360 with the apparatus 304, the messages including information related to various types of communication (e.g., voice, data, multimedia services, associated control signaling, etc.). The wireless link 360 may operate over a communication medium of interest, shown by way of example in FIG. 3 as the medium 362, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 304 and the apparatus 302 for the medium 362.

As a particular example, the medium 362 may correspond to at least a portion of an unlicensed frequency band shared with (an)other RAN and/or other APs and UEs. In general, the apparatus 302 and the apparatus 304 may operate via the wireless link 360 according to one or more radio access types, such as LTE or LTE-U, depending on the network in which they are deployed. These networks may include, for example, different variants of CDMA networks (e.g., LTE networks), Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for wireless communications (e.g., by a government entity such as the Federal Communications Commission (FCC) in the United States), certain communication networks, in particular those employing small cell base stations, have extended operation into unlicensed frequency bands, such as the Unlicensed National Information Infrastructure (U-NII) band used by Wireless Local Area Network (WLAN) technologies, most notably IEEE 802.11x WLAN technologies generally referred to as "Wi-Fi," and LTE in unlicensed spectrum technologies generally referred to as "LTE-U" or "MuLTEFire."

Due to the shared use of the communication medium 362, there is the potential for interference between the wireless link 360 and other wireless links on the shared medium 362. Further, for unlicensed spectrum, some radio access types and some jurisdictions may require contention or "Listen Before Talk (LBT)" for access to the communication medium 362. As an example, a Clear Channel Assessment (CCA) protocol may be used in which each device verifies via medium sensing the absence of other traffic on a shared communication medium before seizing (and in some cases reserving) the communication medium 362 for its own transmissions. In some designs, the CCA protocol may include distinct CCA Preamble Detection (CCA-PD) and CCA Energy Detection (CCA-ED) mechanisms for yielding the communication medium to signaling, voice, and data for a UE (e.g., apparatus 302) or base station (e.g., apparatus 304). The European Telecommunications Standards Institute (ETSI), for example, mandates contention for all devices regardless of their radio access type on certain communication mediums such as unlicensed frequency bands.

Apparatus 302 may also include a positioning measurements component 352 that may be used to obtain location related measurements of signals (e.g., PRS or other signals) transmitted by a base station or AP (e.g., any of eNodeBs 202-210) according to techniques described herein. Location related measurements may include measurements of RSTD for OTDOA positioning and/or measurements of signal propagation time or round trip time (RTT) between a UE 102 and a base station or AP, such as any of eNodeBs 202-210.

Apparatus 304 and 306 may each include a user equipment positioning component 354 and 356, respectively, which may be used to determine a location estimate for a UE 102 (e.g., apparatus 302), according to techniques described herein, based on location related measurements provided by the UE 102 and/or by a base station or AP, such as any of eNodeBs 202-120. Location related measurements obtained by the UE 102 may include measurements of RSTD for OTDOA positioning and/or measurements of signal propagation time or RTT between a UE 102 and a base station or AP, such as any of eNodeBs 202-210. Location related measurements obtained by any of eNodeBs 202-210 (e.g., apparatus 304) may include measurements of signal propagation time or RTT between the UE 102 and a base station or AP, such as any of eNodeBs 202-210.

Methods to position a UE, such as any of the UEs 102 in FIG. 1, include such methods as Enhanced Cell ID (ECID), OTDOA, and Uplink Time Difference of Arrival (UTDOA). With OTDOA, as described previously, a UE 102 may measure RSTDs between pairs of eNodeBs (e.g., eNodeBs 202-210) and then either provide the RSTD measurements to a location server (e.g., E-SMLC 225, SLP 240, or SLP 260) for computation of a location of the UE 102 or compute the location itself (e.g., based on location coordinates for the eNodeBs that may have been provided to the UE 102 by a location server). With ECID, a UE 102 may make measurements of signals from individual eNodeBs (e.g., any of eNodeBs 202-210) such as measurements of a Reference Signal Received Power (RSRP), a Reference Signal Received Quality (RSRQ), and/or signal propagation time or RTT. As with OTDOA, the UE 102 may then either provide the measurements (e.g., of RSRP, RSRQ, and/or RTT) to a location server (e.g., E-SMLC 225, SLP 240, or SLP 260) for computation of a location of the UE 102, or compute the location itself (e.g., based on location coordinates for the eNodeBs that may have been provided to the UE 102 by a location server). With UTDOA, one or more eNodeBs (e.g., one or more of eNodeBs 202-210) and/or one or more separate location measurement units (LMUs) may measure the time of arrival (TOA) of uplink signals transmitted by the UE 102 and may provide the TOA measurements to a location server (e.g., E-SMLC 225, SLP 240, or SLP 260) for computation of a location of the UE 102.

Position methods such as OTDOA and UTDOA are time-based and may require the involved eNodeBs to be synchronized within a few nanoseconds or tens of nanoseconds in order to enable accurate measurements (e.g., of RSTD or TOA) that can enable accurate location of a UE 102 (e.g., with an accuracy of 10-50 meters). There are several main differences between performing positioning operations with LTE wireless access using licensed frequency bands (also referred to herein as "LTE" or "LTE in licensed spectrum") and unlicensed frequency bands (also referred to herein as "LTE in unlicensed spectrum" or "LTE-U"), from the perspective of time-based positioning methods such as OTDOA and UTDOA. For example, with LTE in unlicensed spectrum, while there may be synchronized eNodeB deployments, synchronization among the eNodeBs may not be supported because synchronization may be difficult and expensive to accurately achieve in practice. For example, Home eNodeBs (e.g., Home eNodeB 202) may only be constrained by 3GPP specifications to 0.25 parts per million (ppm) frequency accuracy, whereas macro and local eNodeBs (e.g., eNodeBs 204-210) may be constrained to 0.05 and 0.1 ppm frequency accuracy, respectively. A Home eNodeB at the edge of these constraints may drift by 100 nanoseconds (ns) in as little as 400 milliseconds (ms), compared to a macro eNodeB for which a similar drift would take at least 2 seconds and can be more easily corrected.

Another difference is that with LTE in unlicensed spectrum, there may be lower interference and a lower likelihood of interference. For example, contention-based medium access is a primary mechanism for accessing the unlicensed environment, which may make it easier for a UE 102 to hear other co-channel eNodeB's pilots (including positioning pilots). In addition, eNodeBs operating in an unlicensed environment may more liberally resort to Channel Selection (for the anchor cell) to operate on a cleaner channel.

In a synchronized environment, being able to use synchronization among eNodeBs with LTE in unlicensed spectrum may enable use of OTDOA positioning, as described previously. Specifically, a UE 102 may use downlink time difference of arrival techniques when computing (or assisting a location server in computing) its location. However, unlike with LTE in licensed spectrum, eNodeBs may not always be able to transmit PRS signals at known predefined times.

As a first solution, an eNodeB operating with LTE-U may use the same PRS opportunities as would be used with LTE, but may only transmit PRS signals at a predefined PRS opportunity if the eNodeB wins contention of the medium for a PRS subframe, and may skip transmitting PRS signals at a predefined PRS opportunity if the eNodeB does not win contention. As an enhancement, if an eNodeB is aware of another nearby eNodeB with the same PRS transmission characteristics (e.g., the same predefined PRS subframes at the same transmission times, the same PRS code, and/or the same PRS frequency and bandwidth), the eNodeB can free up the shared medium (e.g., deterministically or statistically) when the eNodeB expects PRS transmission from the neighbor eNodeB. The neighbor eNodeB may do the same, resulting in fewer occasions when both eNodeBs are transmitting PRS at the same time. Note that while this may appear to be superficially similar to PRS blanking or PRS muting, it goes beyond PRS blanking and PRS muting in ensuring that the eNodeB can free up the medium for a sufficient amount of time before the PRS opportunity to ensure that the neighbor eNodeB captures the medium. As another enhancement, to maximize the likelihood of medium acquisition, an eNodeB may employ shorter or more aggressive contention (e.g., one-shot LBT) for sending PRS signals.

As a second solution, an eNodeB operating according to LTE in unlicensed spectrum can transmit PRS signals in the xth subframe of type Z after a PRS opportunity. For example, the xth subframe of type Z after a PRS opportunity may be the first discovery reference signal (DRS) subframe (which contains the primary synchronization signal (PSS) and enhanced secondary synchronization signal (eSSS), and thus may require different PRS mapping). As another example, the xth subframe of type Z after a PRS opportunity may be the first subframe where PRS is allowed according to LTE rules. As yet another example, the xth subframe of type Z after a PRS opportunity may be the first subframe of a frame (in this case the PRS mapping may need to change, depending on the subframe number).

In a third solution, an eNodeB in LTE in unlicensed spectrum can transmit PRS without performing contention for the medium. This may, in some cases, run afoul of some regional channel access requirements. As an enhancement, an eNodeB may utilize blanking or muting as in LTE in licensed spectrum.

For the first and second solutions described above, eNodeBs in LTE in unlicensed spectrum may need to adjust the energy detection (ED) level for PRS transmissions. For example, eNodeBs can increase PRS detectability by employing a lower ED level when contending for PRS transmission. The choice of a lower ED level may be conditional on the PRS-containing transmission opportunity (TxOP) being short (to avoid impacting capacity), or on the past history of PRS transmissions (e.g., if PRS opportunities have been skipped for some period of time, the ED level can be increased).

Figure 4A:
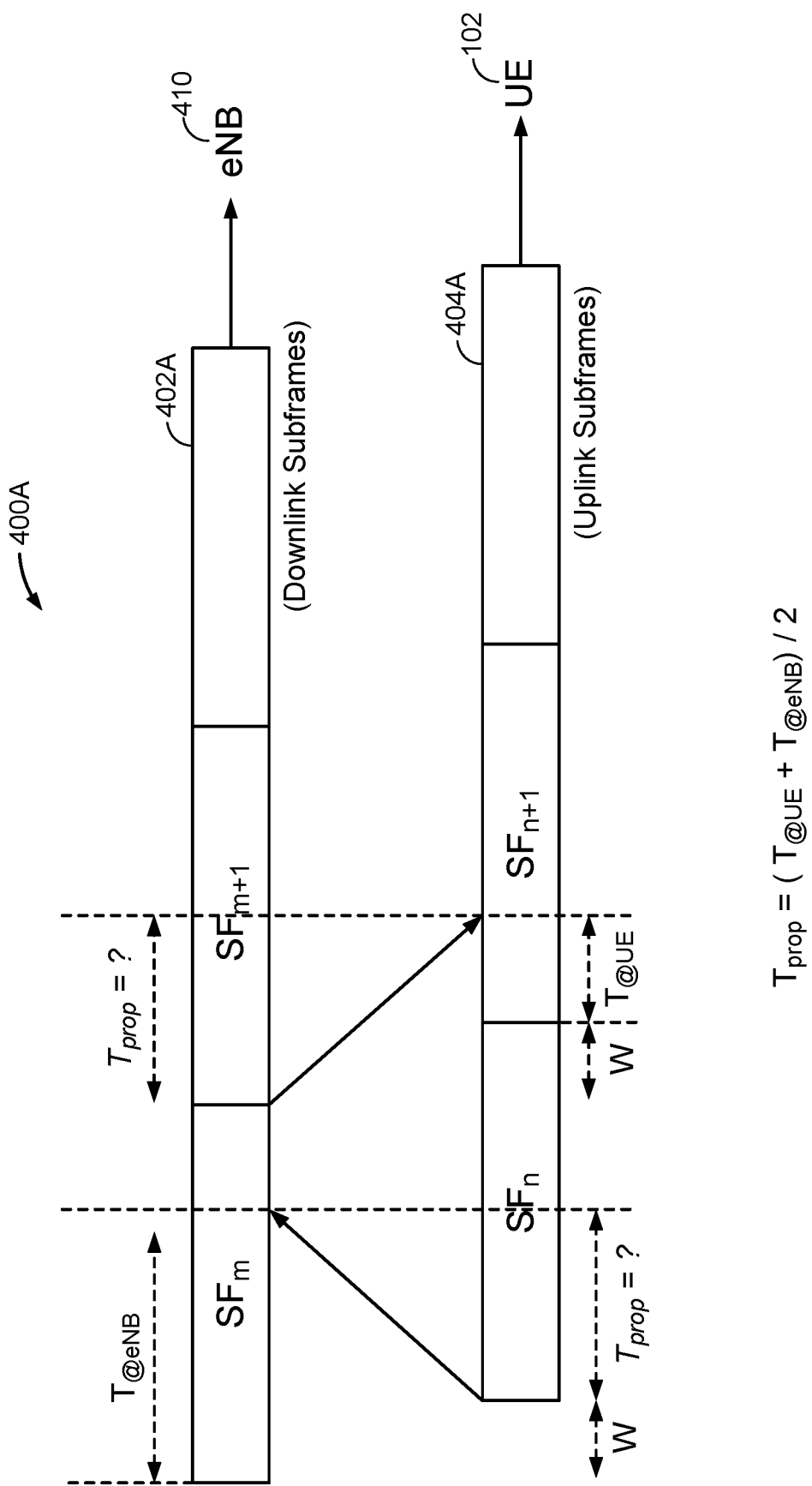
FIG. 4A illustrates an example of determining a propagation time between an eNodeB and a UE.

FIG. 4A illustrates an example of determining a signal propagation time (e.g., an RTT or a one way propagation time) between an eNodeB 410 (which may correspond to any of eNodeBs 202-210) and a UE 102 that use LTE or LTE-U for communication. Referring to FIG. 4A, the eNodeB 410 may transmit pilot signals during a sequence of downlink subframes 402A and the UE 102 may transmit pilot signals during a sequence of uplink subframes 404A. The eNodeB 410 pilot signals may comprise a PRS and/or a cell-specific reference signal (CRS), as defined in 3GPP TS 36.211, in one aspect. The UE 102 pilot signals may comprise a PRS in one aspect, where the parameters for the PRS (e.g., PRS code, PRS bandwidth, PRS frequency, or vshift) are (a) preconfigured in the UE 102, (b) provided to the UE 102 by the eNodeB 410 or a location server (e.g., the E-SMLC 225 or SLP 240 or 260), or (c) dependent on (e.g., obtained by the UE 102 based on) parameters for the eNodeB 410 (e.g., a physical cell ID or cell global ID for a cell supported by eNodeB 410) or parameters for the UE 102 (e.g., an International Mobile Subscriber Identity (IMSI) or International Mobile Equipment Identity (IMEI)).

As shown in FIG. 4A, the time $T_{@eNB}$ is the time from the beginning of a downlink LTE subframe at the eNodeB 410 (here, subframe $SF_m$) to the time a pilot signal indicating the start of the next uplink subframe at the UE 102 (here, subframe $SF_n$) is received by the eNodeB 410 from the UE 102. As also shown in FIG. 4A, the time $T_{@UE}$ is the time from the beginning of an uplink subframe at the UE 102 (here, subframe $SF_{n+1}$) to the time a pilot signal indicating the start of the next downlink subframe at the eNodeB 410 (here, subframe $SF_{m+1}$) is received by the UE 102. The time W is the time from the beginning of a downlink subframe at the eNodeB 410 (e.g., subframe $SF_m$) to the beginning of the immediately following uplink subframe at the UE 102 (here, subframe $SF_n$). It may be observed from FIG. 4A that the one way propagation time between the eNodeB 410 and the UE 102, represented as $T_{prop}$, is given by:

$$T_{prop} = T_{@eNB} - W \quad \text{(Equation 1)}$$

$$T_{prop} = T_{@UE} + W \quad \text{(Equation 2)}$$

Giving $$T_{prop} = (T_{@eNB} + T_{@UE})/2 \quad \text{(Equation 3)}$$

The one way propagation time, $T_{prop}$, is thus half the sum of $T_{@eNB}$ and $T_{@UE}$ and does not depend on the subframe timing difference W. Thus, if the UE 102 measures the time $T_{@UE}$ and the eNodeB 410 measures the time $T_{@eNB}$, and the UE 102 and the eNodeB 410 then provide the measurements $T_{@UE}$ and $T_{@eNB}$, respectively, to a common node, the common node can calculate $T_{prop}$. The common node may be the eNodeB 410 in FIG. 4A, a serving eNodeB for the UE 102 (e.g., if the eNodeB 410 in FIG. 4A is not the serving eNodeB for the UE), the UE 102 in FIG. 4A, a location server, such as E-SMLC 225, or some other entity. Using the one way propagation time $T_{prop}$, the RTT may also be obtained as $2*T_{prop}$.

FIG. 4A shows one particular timing configuration where a subframe boundary occurs at the UE 102 during the propagation of a downlink signal indicating the start of a new subframe at the eNodeB 410, but where a subframe boundary at the eNodeB 410 does not occur during the propagation of an uplink signal indicating the start of a new subframe at the UE 102. In the case that these conditions are reversed, Equations (1) to (3) above will apply if the roles of the UE 102 and eNodeB 410 in FIG. 4A and in Equations (1) to (3) are reversed. Further, as long as the propagation time, $T_{prop}$, is less than half the duration of an LTE or LTE-U subframe (which is 1 millisecond) and corresponding to a distance between the UE 102 and eNodeB 410 of less than around 150 kilometers, a timing configuration will not occur where a subframe boundary occurs at both the UE 102 and eNodeB 410 during the propagation of a downlink signal indicating the start of a new subframe at the eNodeB 410 and an uplink signal indicating the start of a new subframe at the UE 102, respectively. However, a timing configuration may occur where a subframe boundary occurs at neither the UE 102 nor the eNodeB 410 during the propagation of a downlink signal indicating the start of a new subframe at the eNodeB 410 and an uplink signal indicating the start of a new subframe at the UE 102, respectively. For this configuration, Equation (1) remains as above but Equation 2 would change to the following:

$$T_{prop} = T_{@UE} + W - 1 \quad \text{Equation 2A)}$$

Giving $$T_{prop} = (T_{@eNB} + T_{@UE} - 1)/2 \quad \text{Equation 3A)}$$

The common node (e.g., the E-SMLC 225, the UE 102, or the eNodeB 410) that determines the propagation time, $T_{prop}$, may not know whether a configuration for Equation (3) or a configuration for Equation (3A) applies. However, provided the propagation time, $T_{prop}$, is less than half the duration of an LTE or LTE-U subframe (i.e., 0.5 ms), the common node can compute the propagation time using both Equation (3) and Equation (3A). If a configuration for Equation (3) applies, Equation (3A) will produce a negative result. If a configuration for Equation (3A) applies, Equation (3) will produce a result greater than 0.5 ms. Thus, the equation that does not produce a negative result or a result greater than half an LTE or LTE-U subframe (i.e., 0.5 ms) will be the correct equation.

Figure 4B:
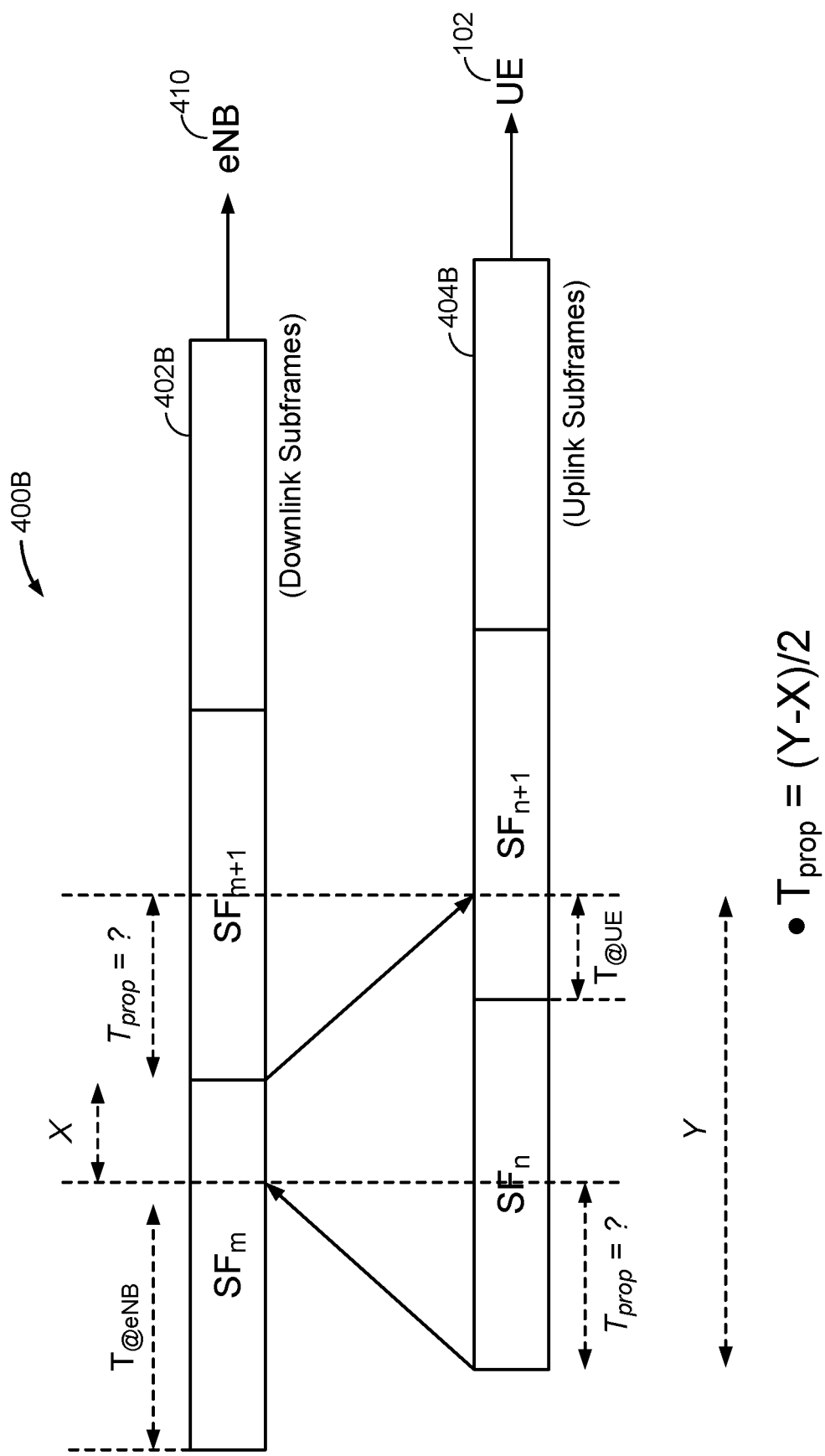
FIG. 4B illustrates another example of determining a propagation time between an eNodeB and a UE.

FIG. 4B illustrates another example of determining the propagation time ($T_{prop}$) and/or RTT between the eNodeB 410 and a UE 102. In FIG. 4B, as in FIG. 4A, the eNodeB 410 may transmit pilot signals during a sequence of downlink subframes 402B and the UE 102 may transmit pilot signals during a sequence of uplink subframes 404B. As shown in FIG. 4B, the times $T_{@eNB}$ and $T_{@UE}$ may be the same as described for FIG. 4A, though these times may not be measured. Further, the time X in FIG. 4B is the time from when a pilot signal indicating the start of an uplink subframe at the UE 102 (here, subframe $SF_n$) is received by the eNodeB 410 and the start of the next downlink subframe at the eNodeB 410 (here, subframe $SF_{m+1}$). Similarly, the time Y in FIG. 4B is the time from when the UE 102 transmits a pilot signal indicating the start of the uplink subframe at the UE 102 (here, subframe $SF_n$) to the time at which the UE 102 receives a pilot signal from the eNodeB 410 indicating the start of a downlink subframe at the eNodeB 410 (here, subframe $SF_{m+1}$). In this case, the propagation delay between the eNodeB 410 and the UE 102, represented as $T_{prop}$, is equal to (Y−X)/2. Here, Y can be measured by the UE 102 and X can be measured by the eNodeB 410. Hence, just as for FIG. 4A, the UE 102 and eNodeB 410 may provide the measurements Y and X, respectively, to a common node, and the common node can calculate $T_{prop}$. As in FIG. 4A, the common node may be the eNodeB 410 in FIG. 4B, a serving eNodeB for the UE 102 (e.g., if the eNodeB 410 in FIG. 4B is not the serving eNodeB for the UE 102), the UE 102 in FIG. 4B, a location server, such as the E-SMLC 225, or some other entity.

For some timing configurations in FIG. 4B, after the UE 102 transmits a pilot signal to the eNodeB 410 indicating the start of an uplink subframe at the UE 102 (e.g., the subframe $SF_n$), the UE 102 may receive a pilot signal from the eNodeB 410 indicating the start of a downlink subframe at the eNodeB 410 (e.g., the subframe $SF_m$), which is not the start of the downlink subframe at the eNodeB 410 (e.g., the subframe $SF_{m+1}$) that follows the reception at the eNodeB 410 of the pilot signal indicating the start of the uplink subframe at the UE 102. To measure Y for the correct downlink subframe (e.g., the subframe $SF_{m+1}$), the UE 102 may wait to receive a pilot signal from the eNodeB 410 indicating the start of the next downlink subframe at the eNodeB 410 (e.g., the subframe $SF_{m+1}$). Alternatively, the UE 102 may add the duration of one subframe (which is 1 millisecond for LTE and LTE-U) to the measurement of Y for the first downlink subframe (e.g., the subframe $SF_m$). Since the UE 102 may not know which is the correct downlink subframe (e.g., the subframe $SF_m$ or the subframe $SF_{m+1}$) for the measurement Y, the UE 102 may simply measure Y based on the first downlink subframe (e.g., the subframe $SF_m$) and provide the measurement to the common entity for calculation of $T_{prop}$. As long as $T_{prop}$ is less than half the duration of one LTE or LTE-U subframe (corresponding to the UE 102 and eNodeB 410 being less than about 150 kilometers apart), the common entity can determine whether to add one subframe duration (equal to 1 ms) to the value of Y provided by the UE 102 according to whether (Y−X) is or is not negative. If (Y−X) is negative, the common entity may add one subframe duration to the value of Y. If (Y−X) is not negative, the common entity may not adjust Y.

Note that other timing measurements and calculations may be used to determine $T_{prop}$ and/or the RTT between the UE 102 and eNodeB 410 shown in FIGS. 4A and 4B, but the concept would remain the same. Further, the downlink pilot signals from the eNodeB 410 that are measured by the UE 102 to obtain $T_{@UE}$ (in FIG. 4A) or Y (in FIG. 4B) need not to be the same type of pilot signals sent by the eNodeB 410 that are shown in FIGS. 4A and 4B, but may instead be other pilot signals that have the same properties from the UE 102 perspective but may be received before or after the downlink pilot signals shown in FIGS. 4A and 4B. The same may apply to the uplink pilot signals from the UE 102 that are measured by the eNodeB 410 to obtain $T_{@eNB}$ (in FIG. 4A) or X (in FIG. 4B). However, the time difference between the measurements by the UE 102 and the eNodeB 410 may need to be limited (e.g., to 100 ms or less) in order to reduce the effects of timing drift at the eNodeB 410 and/or the UE 102, which could otherwise add some error to the relationship between the UE 102 and the eNodeB 410 measurements and the determination of $T_{prop}$ and/or RTT.

As mentioned previously, in FIGS. 4A and 4B, the uplink pilot signals transmitted by the UE 102 that are measured by the eNodeB 410 and the downlink pilot signals transmitted by the eNodeB 410 that are measured by the UE 102 may each be PRS signals. However, the eNodeB 410 may not be synchronized with other eNodeBs in the same network (e.g., in RAN 120A or 120B) and the timing of the eNodeB 410 and the UE 102 in FIGS. 4A and 4B may be arbitrary.

A PRS dictionary may define a set of distinct PRS signals that each differ from all other PRS signals in the PRS dictionary due to using a different PRS code, different PRS frequency, and/or a different PRS timing. The PRS dictionary for downlink PRS signals may include sufficient PRS signals for the largest number of nodes (e.g., eNodeBs) expected to transmit PRS within the same local geographical area (e.g., an area within which PRS signals from most or all nodes can be received at the same location and/or can cause mutual interference). For uplink PRS, a large uplink PRS dictionary may enable more UEs (e.g., UEs 102) to transmit PRS signals and take advantage of asynchronous PRS-based positioning, as exemplified in association with FIGS. 4A and 4B.

A PRS identity may be a physical cell ID (e.g., with a range of 0 to 503) or a PRS ID (e.g., with a range of 0 to 4095) and may be as defined in 3GPP TS 36.211 and TS 36.355 and used to define and generate a distinct PRS code. A location server, such as the E-SMLC 225 or SLP 240 or 260, may distribute downlink PRS identities to eNodeBs and/or uplink PRS identities to UEs 102 and/or eNodeBs. An eNodeB (e.g., any of eNodeBs 202-210 or eNodeB 410) or a location server (e.g., E-SMLC 225) may provide a PRS identity to a UE 102 and possibly other PRS parameters (e.g., PRS frequency and/or PRS bandwidth) and an indication of when the UE 102 may or should transmit a PRS signal (e.g., a start time, end time, duration, number of consecutive PRS subframes, and/or periodicity for PRS transmission by the UE 102). The UE 102 may then transmit the PRS in certain uplink subframes (e.g., as indicated by the eNodeB or location server) to enable determination of a propagation time or RTT between the UE 102 and one or more other eNodeBs, for example, as described in FIGS. 4A and 4B. The determined propagation time or RTT may be used (e.g., by a location server) to determine the location of the UE 102, for example, using methods already known for the ECID position method or using techniques described later in association with FIG. 5. In some aspects, an uplink PRS transmitted by a UE 102 may be the same as the PRS defined for eNodeB transmission in 3GPP TS 36.211, but transmitted uplink and using spectrum allocated for UE transmission. In some aspects, an uplink PRS transmitted by a UE 102 may be an (enhanced version of an) uplink physical pilot (e.g., a specific reference signal (SRS)).

An unlicensed environment may offer both benefits (e.g., lower interference) and challenges (e.g., PRS signals may not always be able to win contention of the shared medium) for transmitting PRS signals. To address the contention concern, a sender of a PRS signal (e.g., a UE or eNodeB) may attempt to send PRS signals as part of contention-free signaling or refrain from sending PRS signals if contention cannot be resolved.

Figure 5:
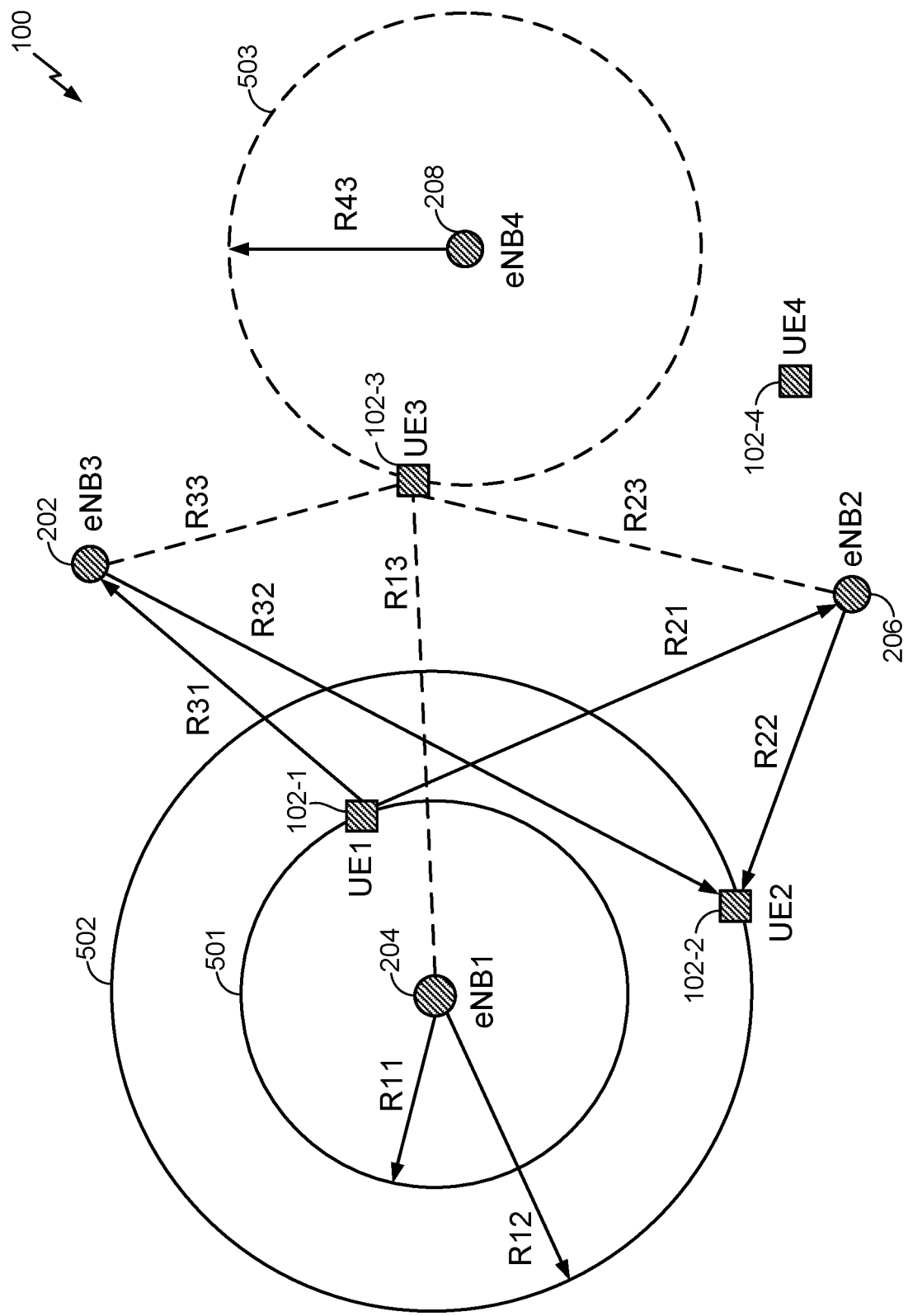
FIG. 5 illustrates an example of a technique for positioning of a UE in the wireless communication system of FIG. 1.

FIG. 5 illustrates an exemplary geographic deployment of various eNodeBs (eNodeBs 202, 204, 206, and 208) and UEs 102 (UEs 102-1, 102-2, 102-3, and 102-4) in the wireless communications system 100 of FIG. 1 and FIG. 2. In the example of FIG. 5, eNodeB 204 is the serving eNodeB for UEs 102-1 and 102-2 and eNodeB 208 is the serving eNodeB for UE 102-3. In addition, eNodeBs 202 and 206 are nearby to UEs 102-1, 102-2, and 102-3 (e.g., support neighbor cells for these UEs). For ease of reference in association with FIG. 5, UEs 102-1, 102-2, 102-3, and 102-4 are referred to as UE 1, UE 2, UE 3, and UE 4, respectively, and eNodeBs 204, 206, 202, and 208 are referred to as eNB 1, eNB 2, eNB 3, and eNB 4, respectively. There may be other eNodeBs and UEs 102 not shown in FIG. 5. Further, a UEn (where n is a positive integer) may be referred to as a "UE n" and an eNBm (where m is a positive integer) may be referred to as "eNB m" for clarity in distinguishing the integers n and m when used as labels for UEs and eNBs.

In order to obtain the locations of one or more of the UEs 102 in FIG. 5, a measurement or measurements to enable determination of an RTT or a one-way propagation time between each UE 102 and the UE 102's serving eNodeB may be obtained by each UE 102 and/or by the serving eNodeB for each UE 102, for example, using the techniques described previously in association with FIGS. 4A and 4B. Each UE 102 may also or instead measure one or more RSTDs between pairs of nearby eNodeBs (e.g., which may or may not include the serving eNodeB for the UE 102). The measurements may then be sent to a location server (or other common node), such as the E-SMLC 225 or SLP 240 or 260. The location server may then determine an RTT or a propagation delay between each UE 102 and the serving eNodeB for the UE 102 (e.g., using the techniques described in association with FIGS. 4A and 4B). The location server may then use the determined RTTs or propagation times and the RSTD measurements provided by each UE 102 to obtain the location of each UE 102. The location server may make use of the known locations of the eNodeBs and any known real time differences (RTDs) in the transmission timing between the eNodeBs to compute the UE 102 locations.

In a synchronized network, the RTDs between pairs of eNodeBs may all be zero if the eNodeBs are synchronized to the same time (e.g., if the start of each new LTE or LTE-U subframe at each eNodeB occurs at precisely the same time and/or if the start of system frame number zero at each eNodeB occurs at precisely the same time). In other synchronized network implementations, while LTE or LTE-U timing may not be the same for all eNodeBs, the RTDs between pairs of eNodeBs may be constant and may be known from information used to configure the synchronization. A problem may occur, however, if the eNodeBs are part of an asynchronous network (e.g., an LTE-U network), since the RTDs between pairs eNodeBs may typically not be known and/or may not remain constant over long periods of time (e.g., an hour or more). In that case, the location server may use additional RSTD measurements from UEs 102 (if available) to both position the UEs 102 and obtain the RTDs between the eNodeBs by using the additional RSTD measurements to solve for the additional unknown RTDs. However, this may not be possible if UEs 102 are only able to obtain one or a few RSTD measurements, since there may then be insufficient RSTD measurements to solve for both the unknown UE location coordinates and unknown RTDs. In such a case, the location server may use both RSTD and RTT measurements to locate UEs 102 and obtain RTDs, as described below.

In the example shown in FIG. 5, RSTDs, RTDs, ranges, and other related variables and parameters are defined as follows:

$TOA_{ij}$=Time of Arrival of an uplink signal from eNodeB i at UE j $T_i$=Transmission time of an uplink signal at eNodeB i $RSTD_{ijk}$=an RSTD measurement between eNodeBs i and j obtained by UE k and given by ($TOA_{ik}$-$TOA_{jk}$), where the TOAs are measured for corresponding signals (e.g., signals indicating the start of a new subframe at each eNodeB)

$RTD_{ij}$=an RTD between eNodeBs (or cells) i and j, given by ($T_i$-$T_j$) for transmission of corresponding signals (e.g., indicating the start of a new subframe at an eNodeB)

$R_{ij}$=a range (e.g., straight line distance) from an antenna for eNodeB i to UEj Then for eNodeBs i and k and UEs j and m:

$$R_{ij}-R_{kj}=c*(RSTD_{ikj}-RTD_{ik}) \quad \text{(Equation 4)}$$

$$R_{im}-R_{km}=c*(RSTD_{ikm}-RTD_{ik}) \quad \text{(Equation 5)}$$

Where c=signal propagation speed (e.g., the speed of light) Giving $$R_{km}-R_{kj}=c*(RSTD_{ikj}-RSTD_{ikm})+(R_{im}-R_{ij}) \quad \text{(Equation 6)}$$

Equation (6) may be valid for a condition (a) in which the same uplink signals from the eNodeBs i and k are measured by both UEs j and m to obtain the RSTDs or a condition (b) in which the uplink signals measured by UE j are transmitted by eNodeBs i and k at the same time interval (e.g., by the same integer number of LTE or LTE-U subframes) before or after the corresponding uplink signals measured by UE m. To enable condition (a) or condition (b) in other cases A and B (as described further below), a location server may uniquely adjust one of the RSTD measurements for either UE j or UE m by adding or subtracting an integer multiple of the LTE subframe time (1 ms). For case A, the location server is assumed not to know the location of UE m or UE j and the RSTD measurement is uniquely adjusted to be within one half subframe duration (e.g., 0.5 ms) of the other (unadjusted) RSTD measurement. The RSTD adjustment for case A may ensure condition (a) or (b) when the pair of eNodeBs i and k are separated from one another by less than one quarter of the signal propagation distance over one LTE or LTE-U subframe (about 75 kms). This is because the RSTD for the same signals from the pair of eNodeBs i and k (and measured by UE m or j at any arbitrary location) may have to lie within a window of duration 2*T, where T is the signal propagation time between the two eNodeBs i and k. To ensure the two RSTDs are within 0.5 ms of each other, T should be less than 0.25 ms as assumed for case A. A location server may verify that the adjustment can be used for case A by verifying that the locations of two eNodeBs i and k are within around 75 km of each other: if the eNodeBs i and k are separated by more than 75 kms the location server may not be able to use Equation (6). For case B, the location server is assumed to know the approximate locations of UE m and UE j with enough accuracy to determine an expected difference between the two RSTD measurements to within one half the duration of an LTE subframe (i.e., 0.5 ms). For case B, the location server may uniquely adjust one RSTD by an integer multiple of one LTE subframe duration (i.e., 1 ms) so that the difference of the two RSTDs is within 0.5 ms of the expected difference between the two RSTDs. For case B, the eNodeBs i and k may be separated by any distance (e.g., a distance greater than 75 kms). The adjustment of one RSTD in Equation (6) as just described may be used in other equations containing two RSTDs for the same pair of eNodeBs, such as Equation (7) described further below.

In Equation (6), $R_{im}$ and $R_{ij}$ can be known if eNodeB i is the serving eNodeB for UEs m and j and if the RTT or one way propagation time between eNodeB i and each of UEs m and k is measured or determined, for example, as described previously in association with FIGS. 4A and 4B. Additionally, UE j may measure and provide $RSTD_{ikj}$ and UE m may measure and provide $RSTD_{ikm}$. In that case, all quantities on the right hand side of Equation (6) can be determined and known, for example, by a location server. This provides a known value for the left hand side of Equation (6), which gives the difference between the ranges of UEs m and j to the common eNodeB k. In obtaining this value, the UEs m and j should each measure an RSTD between their common serving eNodeB i and the eNodeB k and assist determination of (or measure) the propagation time from each UE to the common serving eNodeB i. If the RSTD measurement by UEs m and j is repeated for another eNodeB n, another equation can be obtained in the same way as Equation (6) as:

$$R_{nm} - R_{nj} = c^*(RSTD_{inj} - RSTD_{inm}) + (R_{im} - R_{ij}) \quad \text{(Equation 7)}$$

As in the case of Equation (6), all quantities on the right hand side of Equation (7) can be determined and known, for example, by a location server. This provides a known value for the left hand side of Equation (7), which gives the difference between the ranges of UEs m and j to the common eNodeB n. In obtaining the left hand sides of both Equations (6) and (7), the UEs m and j need to measure two RSTDs each between their common serving eNodeB i and two other common eNodeBs k and n, and measurements from the UEs m and j and/or from the common serving eNodeB i are needed to allow determination of the propagation time (or RTT) and hence the range between each UE m and j and the common serving eNodeB i. Using just this information and the known location of each eNodeB antenna for eNodeBs i, k, and n, a location server (e.g., the E-SMLC 225) may determine both the locations of the UEs m and j and the RTDs between the eNodeBs i, k, and n.

As an example of determining the locations of the UEs m and j, assume that for the eNodeBs, i=1, k=2, and n=3 and that for the UEs, m=1 and j=2. The UEs and eNodeBs are then as shown in FIG. 5 (e.g., ignoring UE 3, UE 4, and eNB 4). Due to knowing R11 and R12 in FIG. 5, UE 1 and UE 2 are constrained to lie on the circles 501 and 502 in FIG. 5, respectively, where circle 501 has a radius of R11 and circle 502 has a radius of R12 and both circles are centered on eNB 1. In addition, the difference between the ranges R21 and R22 of UE 1 and UE 2, respectively, to eNB 2 is known (from Equation (6)) as is the difference between the ranges R31 and R32 of UE 1 and UE 2, respectively, to eNB 3 (from Equation (7)). These known properties provide four separate geometric constraints on the locations of UE 1 and UE 2 and, equivalently, provide four separate equations for horizontal x and y coordinates of UE 1 and UE 2 based on Equations (6) and (7) and two other equations associating the x and y coordinates of UE 1 and UE 2 to the known circles 501 and 502, respectively. The x and y coordinates of UE 1 and UE 2 may then be obtained algebraically, for example, by iterative means by starting with approximations for the x and y coordinates.

Once the locations of UE 1 and UE 2 are obtained, the RTD between the serving eNB 1 and each of eNB 2 and eNB 3 can be obtained using Equation (4) or (5) for eNB 2 and analogs of Equation (4) or (5) for eNB 3. The RTD between eNB 2 and eNB 3 can then be obtained as the difference of the RTDs between eNB 1 and each of eNB 2 and eNB 3. The generalization of this to any pair of UEs m and j and any three eNodeBs k, and n where eNodeB i is a common serving eNodeB for UEs m and j is already present in Equations (4) to (7), though for the purposes of providing the example in FIG. 5, specific values for i, j, k, m, and n have been used.

The technique as so far described enables location of a pair of UEs 102 with a common serving eNodeB that each obtain two RSTD measurements between the common serving eNodeB and two other common eNodeBs and for which a range to the common serving eNodeB can be determined from measurements of an RTT or propagation time from each UE 102 to the common serving eNodeB. However, the technique may be extended to allow location of one UE 102 in the pair of UEs 102 some time after measurements are obtained for the other UE 102 in the pair. In addition, the technique may be extended to enable location of other UEs 102 that obtain RSTD measurements but for which measurements of RTT or propagation time may not be available and where such location may be obtained at a later time.

As an example of this extension, UE 102-1 in FIG. 5 may measure a first RSTD between the serving eNodeB 204 and eNodeB 206 and a second RSTD between the serving eNodeB 204 and eNodeB 202. The UE 102-1 and/or the serving eNodeB 204 may also make measurements to enable determination of a first RTT or a first propagation time between UE 102-1 and the serving eNodeB 204 (e.g., as described for FIGS. 4A and 4B). The UE 102-1 may also obtain additional RSTD measurements between other pairs of eNodeBs (e.g., between serving eNodeB 204 and eNodeB 208). The measurements may be sent by UE 102-1 and by serving eNodeB 204, if eNodeB 204 obtains any measurements, to a location server (not shown in FIG. 5), such as E-SMLC 225. If the UE 102-1 only provides the first and second RSTD measurements and no additional RSTD measurements, the location server may not be able to determine the location of UE 102-1 (e.g., if the RTDs between eNodeBs 202, 204, and 206 are unknown). If the UE 102-1 provides the first and second RSTD measurements and additional RSTD measurements, the location server may be able to determine the location of UE 102-1, by using the additional RSTD measurements to help determine the RTDs between eNodeBs 202, 204, and 206. In either case, the location server may store the received first and second RSTD measurements as well as any additional RSTD measurements and the first RTT (or first propagation time) determined between UE 102-1 and the serving eNodeB 204.

At the same time as measurements are received for UE 102-1 or at some later time, the location server may receive similar measurements for UE 102-2 in FIG. 5. For example, UE 102-2 in FIG. 5 may measure a third RSTD between the serving eNodeB 204 and eNodeB 206 and a fourth RSTD between the serving eNodeB 204 and eNodeB 202. The UE 102-2 and/or the serving eNodeB 204 may also obtain measurements to enable determination of a second RTT or second propagation time between UE 102-2 and the serving eNodeB 204. The UE 102-2 may also obtain additional RSTD measurements between other pairs of eNodeBs (e.g., between serving eNodeB 204 and eNodeB 208). The measurements may be sent by UE 102-2 and by serving eNodeB 204, if eNodeB 204 obtains any measurements, to the location server. If the UE 102-2 only provides the third and fourth RSTD measurements and no additional RSTD measurements and if the location server is able to determine the second RTT or second propagation time, the location server may employ the technique previously described in association with Equations (4) to (7) and FIG. 5 to obtain a location for UE 102-2 (as well as a location or previous location for UE 102-1) and RTDs between the eNodeBs 202, 204, and 206. In this case, the previous technique could use the first and second RSTD measurements and the first RTT or first propagation time that were stored by the location server for UE 102-1 as well as the third and fourth RSTD measurements and the second RTT or second propagation time determined for UE 102-2. Any additional RSTD measurements provided by UE 102-2 may also be used. As described previously, the technique described in association with Equations (4) to (7) also enables determination of the RTDs between eNodeBs 202, 204, and 206. The location server may then store the determined RTDs.

At some later time, the location of another UE, e.g., UE 102-3 in FIG. 5, may be needed. In this case, UE 102-3 may measure a fifth RSTD between eNodeBs 204 and 206 and a sixth RSTD between eNodeBs 204 and 202. The UE 102-3 and/or the serving eNodeB 208 for UE 102-3 may also obtain measurements to enable determination of a third RTT or third propagation time between UE 102-3 and the serving eNodeB 208. The UE 102-3 may also obtain additional RSTD measurements between other pairs of eNodeBs (e.g., between serving eNodeB 208 and one more other eNodeBs). The measurements may be sent by UE 102-3 and by serving eNodeB 208, if eNodeB 208 obtains any measurements, to the location server. Since the location server has previously obtained and stored the RTD between eNodeBs 204 and 206 and the RTD between eNodeBs 204 and 202, the location server may use the fifth and sixth RSTDs to obtain a difference (R13−R23) in the range of UE 102-3 to eNodeBs 204 and 206 (e.g., using the fifth RSTD, the RTD between eNodeBs 204 and 206 and Equation (4) or (5)) and a difference (R13−R33) in the range of UE 102-3 to eNodeBs 204 and 202 (e.g., using the sixth RSTD, the RTD between eNodeBs 204 and 202 and Equation (4) or (5)). If the location server has also determined the third RTT or third propagation time, the location server can locate the UE 102-3 on the circle 503 in FIG. 5 centered on the serving eNodeB 208 and with known radius R43 (equal to the range corresponding to the third RTT or propagation time). The two differences in ranges and the location of UE 102-3 on the circle 503 can be used by the location server to obtain the location of the UE 102-3. If the location server does not receive measurements (from the UE 102-3 and/or the serving eNodeB 208) enabling determination of the third RTT or third propagation time, the location server may still be able to locate UE 102-3 if UE 102-3 provides additional RSTD measurements. For example, if UE 102-3 provides an additional RSTD for serving eNodeB 208 and eNodeB 204 and if the location server has previously obtained and stored the RTD between eNodeBs 204 and 208 (e.g., due to performing the procedure described previously for UEs 102-1 and 102-2 for other UEs or for additional RSTD measurements from UEs 102-1 and 102-2 for eNodeBs 204 and 208), the location server can locate UE 102-3 using well known principles for OTDOA.

The procedure described above to locate UE 102-3 may be reused to locate other UEs, such as UE 102-4 in FIG. 5, if these other UEs obtain RSTD measurements between pairs of eNodeBs and provide these to the location server. In this case, RTD or propagation times may also be obtained for some of these other UEs to assist with location determination (e.g., as described previously for UEs 102-2 and 102-3) or may not be.

The determination of UE 102 locations as described above enables UE locations to be obtained at different times by the location server but may rely on the determined RTD values remaining almost constant. To allow for RTDs that may change (e.g., due to timing drift by one or both eNodeBs for each RTD), the location server may obtain new RTD values (e.g., as described above in association with Equations (4) to (7)) when and as the location of each UE 102 is obtained. The new value for any RTD may be combined with any existing value for the RTD, for example, using weighted averaging. This may enable more accurate values for RTDs to be obtained and may allow the location server to adjust RTD values in step with actual changes in RTD between pairs of eNodeBs.

The number of RTDs that may need to be stored by the location server for a network comprising N eNodeBs could be approximately $N*(M−1)/2$ where M ($M \leq N$) is the maximum number of eNodeBs visible to a UE 102 at any location such that an RSTD measurement for each eNodeB is possible. However, a location server may store RTDs in a more compact manner to reduce the number of stored RTDs. As an example, the location server may store a single RTD for each eNodeB using a single reference eNodeB that is common to all RTDs. Alternatively, a single RTD may be stored for each eNodeB using a fictitious eNodeB that is common to all RTDs and whose time corresponds to some precise absolute time (e.g., Coordinated Universal Time (UTC time) or Global Positioning System (GPS) time), which may be equivalent to storing the difference in the transmission timing of each eNodeB and an absolute time. A location server may also store a timestamp for each RTD indicating the most recent time at which an RTD was obtained or updated. The timestamp may be used by the location server to identify RTDs that were obtained or updated at more than some threshold duration in the past and that may now be inaccurate due to timing drift in the associated eNodeBs. A location server may also maintain statistics (e.g., a standard deviation and/or average rate of increase or decrease) for each RTD (e.g., as determined by comparing a previous value for the RTD with a later value) that may be used by the location server to determine a threshold period of time for the RTD during which the RTD may be expected to remain accurate (e.g., with an expected change of less than 100 ns).

Figure 6:
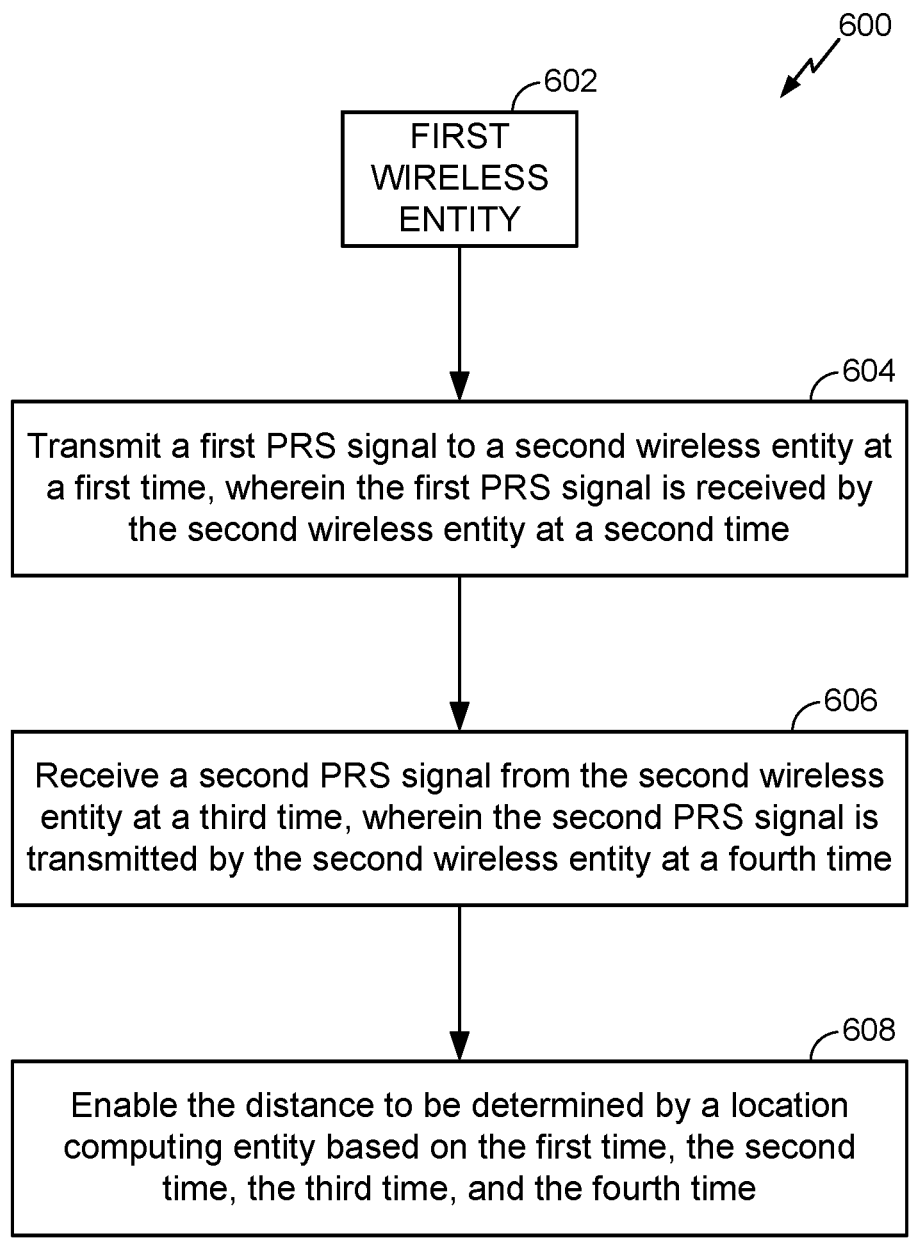
FIG. 6 illustrates an exemplary flow for determining a distance between a first wireless entity and a second wireless entity according to at least one aspect of the disclosure.

FIG. 6 illustrates an exemplary flow 600 for determining a distance (or range) between a first wireless entity 602 and a second wireless entity (not shown) according to at least one aspect of the disclosure. The first wireless entity 602 may be a UE (e.g., any of UEs 102-1 to 102-5 or apparatus 302) or a base station, such as an eNodeB (e.g., any of eNodeBs 202 to 210, apparatus 304, or eNodeB 410) and the second wireless entity may be the other of the UE or the base station (such as an eNodeB). The base station, whether the first wireless entity 602 or the second wireless entity, may be the serving base station (such as a serving eNodeB or Home eNodeB) for the UE.

At block 604, the first wireless entity 602 transmits a first PRS signal to the second wireless entity at a first time, and the first PRS signal is received by the second wireless entity at a second time. Means for performing the functionality associated with block 604 may include, for example, a communication device, such as communication device 308 or 314 in FIG. 3, a processing system, such as processing system 332 or 334 in FIG. 3, or a processing system in conjunction with a communication device, such as processing system 332 or 334 in conjunction with communication device 308 or 314, respectively.

At block 606, the first wireless entity 602 receives a second PRS signal from the second wireless entity at a third time, where the second PRS signal was transmitted by the second wireless entity at a fourth time. In an aspect, the first time may occur before the third time. For this aspect, the first and third PRS signals may be as shown and described previously for FIGS. 4A and 4B, when the first wireless entity 602 is the UE. If the first wireless entity 602 is the eNodeB, the first and third PRS signals may be as shown and described previously for FIGS. 4A and 4B when the eNodeB and the UE roles in FIGS. 4A and 4B are reversed. In another aspect, the first time may occur after the third time. In this other aspect, the first and third PRS signals may be as shown and described previously for FIGS. 4A and 4B when the first wireless entity 602 is the eNodeB. If the first wireless entity 602 is the UE for this other aspect, the first and third PRS signals may be as shown and described previously for FIGS. 4A and 4B when the eNodeB and the UE roles in FIGS. 4A and 4B are reversed. Means for performing the functionality associated with block 606 may include, for example, a communication device, such as communication device 308 or 314 in FIG. 3, a processing system, such as processing system 332 or 334 in FIG. 3, or a processing system in conjunction with a communication device, such as processing system 332 or 334 in conjunction with communication device 308 or 314, respectively.

In an aspect, the first wireless entity 602 and the second wireless entity may communicate with each other on an unlicensed radio frequency spectrum, such as LTE in unlicensed spectrum (e.g., LTE-U). In that case, the first wireless entity 602 may transmit the first PRS signal after winning contention of a shared wireless communications medium being utilized for the unlicensed radio frequency spectrum. In an aspect, the first time and the fourth time may each correspond to the start of a subframe for LTE or LTE-U, as illustrated in FIGS. 4A and 4B.

At block 608, the first wireless entity 602 enables the distance (or range) to be determined by a location computing entity based on the first time, the second time, the third time, and the fourth time. In an aspect, the location computing entity may be the first wireless entity, the second wireless entity, or a location server (not shown), such as the E-SMLC 225, the SLP 240, or the SLP 260. In one aspect, enabling the distance to be determined by the location computing entity includes sending the first time and the third time to the location computing entity (e.g., using the LPP or LPP/LPPe positioning protocol when the location computing entity is a location server, or using the Radio Resource Control (RRC) protocol defined by 3GPP for LTE when the location computing entity is the second wireless entity). In this aspect, the location computing entity can determine the distance between the first wireless entity 602 and the second wireless entity (e.g., using one of the techniques described in association with FIGS. 4A and 4B).

In another aspect, the first wireless entity 602 may obtain the difference between the first time and the third time and sends the difference to the location computing entity (e.g., using the LPP or LPP/LPPe positioning protocol or the RRC protocol), and the location computing entity can then determine the distance between the first wireless entity 602 and the second wireless entity (e.g., using the technique described in association with FIG. 4B). The difference may correspond to the time Y in FIG. 4B when the first wireless entity 602 is the UE and the time X in FIG. 4B when the first wireless entity 602 is the eNodeB.

In a further aspect, the first time may correspond to the start of an LTE or LTE-U subframe transmitted by the first wireless entity 602 and the first wireless entity 602 may obtain the difference between the third time and the start of the current subframe being transmitted by the first wireless entity 602 and may send the difference to the location computing entity (e.g., using the LPP or LPP/LPPe positioning protocol or the RRC protocol), and the location computing entity can then determine the distance between the first wireless entity 602 and the second wireless entity (e.g., using the technique described in association with FIG. 4A). In this further aspect, the difference may correspond to the time $T_{@UE}$ in FIG. 4A when the first wireless entity 602 is the UE and the time $T_{@eNB}$ in FIG. 4A when the first wireless entity 602 is the eNodeB.

In another aspect of block 608, the first wireless entity 602 enabling the distance to be determined by the location computing entity may mean that the first wireless entity 602 is the location computing entity and calculates the distance itself. Means for performing the functionality associated with block 608 may include, for example, a communication device, such as communication device 308 or 314 in FIG. 3, a processing system, such as processing system 332 or 334 in FIG. 3, or a processing system in conjunction with a communication device, such as processing system 332 or 334 in conjunction with communication device 308 or 314, respectively.

In another aspect of the present disclosure, a cooperative positioning method is disclosed that can be utilized in an asynchronous unlicensed environment. For example, if two UEs (e.g., UEs 102) participate in positioning operations at roughly the same time and measure an RTT or a one way propagation time between each UE and a common serving eNodeB and an OTDOA RSTD between each of two other common eNodeBs and the common serving eNodeB, then the positions of both UEs can be computed at a common node (e.g., the E-SMLC 225) from these measurements and knowledge of the positions of the involved eNodeBs. There is no synchronicity assumption needed between the eNodeBs.

Figure 7:
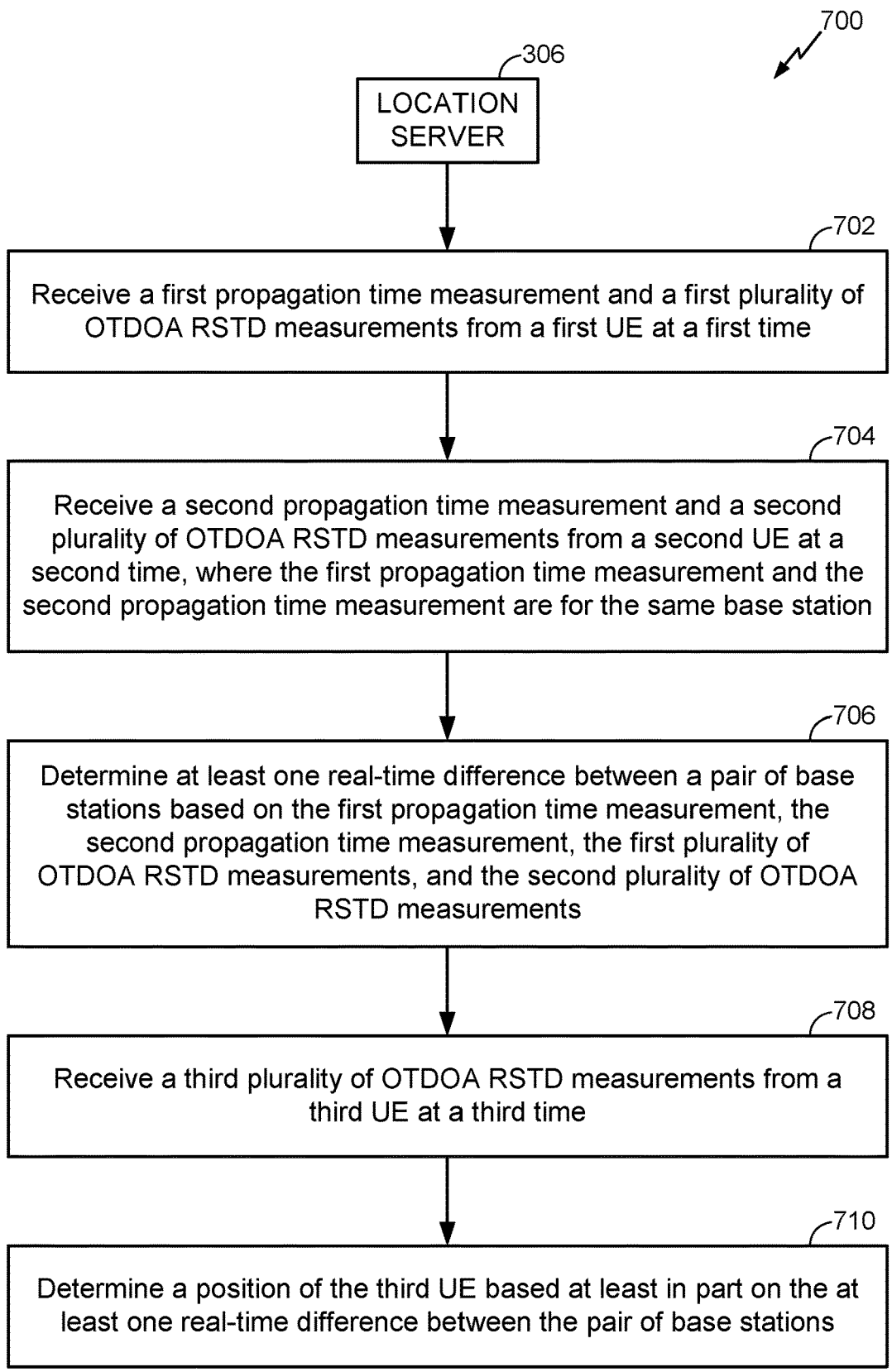
FIG. 7 illustrates an exemplary flow for positioning a UE according to at least one aspect of the disclosure.

FIG. 7 illustrates an exemplary flow 700 for cooperatively positioning a UE 102 according to at least one aspect of the disclosure. The flow 700 may be performed by the apparatus 306, which may be a location server, such as the location server 170A, the location server 170B, the E-SMLC 225, the GMLC 220, the SLP 240, or the SLP 260.

At block 702, the apparatus 306 receives a first propagation time measurement and a first plurality of OTDOA RSTD measurements from a first UE 102 at a first time. The propagation time measurement may be a measurement of either the RTT or the one way signal propagation time between the first UE 102 and a base station (e.g., a serving eNodeB for the first UE 102). In another aspect, the first propagation time measurement may be a measurement that enables determination of an RTT or one way signal propagation time between the first UE 102 and a base station by apparatus 306, for example, based on another measurement provided to apparatus 306 by the base station and using the techniques described in association with FIG. 4A or FIG. 4B. As an example of this other aspect, the first UE 102 may measure and provide to the apparatus 306 a value for either the time Y in FIG. 4B or the time $T_{@UE}$ in FIG. 4A and the base station may measure and provide to the apparatus 306 either the time X in FIG. 4B or the time $T_{@eNB}$ in FIG. 4A, respectively. Means for performing the functionality associated with block 702 may include, for example, a communication device, such as communication device 326 in FIG. 3, a processing system, such as processing system 336 in FIG. 3, or a processing system in conjunction with a communication device, such as processing system 336 in conjunction with communication device 326.

At block 704, the apparatus 306 receives a second propagation time measurement and a second plurality of OTDOA RSTD measurements from a second UE 102 at a second time, where the first propagation time measurement and the second propagation time measurement are for the same base station (e.g., the same eNodeB). In an aspect, the first propagation time measurement and the second propagation time measurement are for a common serving base station for the first UE 102 and the second UE 102. In an aspect, the first and second UEs 102 may be the same UE. For example, in this aspect, the first propagation time measurement and the first plurality of OTDOA RSTD measurements may be obtained by the UE 102 at a different time and at a different location to the second propagation time measurement and second plurality of OTDOA RSTD measurements. This may enable the apparatus 306 to treat the first propagation time measurement and the first plurality of OTDOA RSTD measurements as if they were obtained by a different UE 102 to the second propagation time measurement and the second plurality of OTDOA RSTD measurements.

In an aspect, the first time and the second time may be within a threshold period of time of each other. The threshold may be a few seconds, one minute or up to several hours or more, depending on the timing accuracy (e.g., clock accuracy) of the base stations. In an aspect, the base stations associated with the first and second propagation time measurements and the first and second pluralities of OTDOA RSTD measurements are not synchronized with each other and/or not synchronized with some absolute time, such as GPS time or UTC time. In an aspect, the first and second propagation time measurements and the first and second pluralities of OTDOA RSTD measurements may be measurements for LTE radio access in unlicensed spectrum (e.g., LTE-U). Means for performing the functionality associated with block 704 may include, for example, a communication device, such as communication device 326 in FIG. 3, a processing system, such as processing system 336 in FIG. 3, or a processing system in conjunction with a communication device, such as processing system 336 in conjunction with communication device 326.

At block 706, the apparatus 306 determines at least one real-time difference between a pair of base stations based on the first propagation time measurement, the second propagation time measurement, the first plurality of OTDOA RSTD measurements, and the second plurality of OTDOA RSTD measurements. The pair of base stations may be associated with the first plurality of OTDOA RSTD measurements and the second plurality of OTDOA RSTD measurements. Means for performing the functionality associated with block 706 may include, for example, a processing system, such as processing system 336 in FIG. 3.

At block 708, the apparatus 306 receives a third plurality of OTDOA RSTD measurements from a third UE 102 at a third time. In an aspect, the second time and the third time may be within a threshold period of time of each other. As before, the threshold may be a few seconds, one minute, or up to several hours or more, depending on the timing accuracy (e.g., clock accuracy) of the base stations. In an aspect, the second and third UEs 102 may be the same UE 102. In this aspect, the first and second propagation time measurements and the first and second pluralities of OTDOA RSTD measurements may be previous propagation time measurements and previous OTDOA RSTD measurements performed by the same UE 102. Means for performing the functionality associated with block 708 may include, for example, a communication device, such as communication device 326 in FIG. 3, a processing system, such as processing system 336 in FIG. 3, or a processing system in conjunction with a communication device, such as processing system 336 in conjunction with communication device 326.

At block 710, the apparatus 306 determines a position of the third UE 102 based at least in part on the at least one real-time difference between the pair of base stations. In one aspect, the apparatus 306 receives (i) the first propagation time measurement and the first plurality of OTDOA RSTD measurements from the first UE 102, (ii) the second propagation time measurement and the second plurality of OTDOA RSTD measurements from the second UE 102, and/or (iii) the third plurality of OTDOA RSTD measurements from the third UE 102 using the LPP or LPP/LPPe positioning protocol. Means for performing the functionality associated with block 710 may include, for example, a processing system, such as processing system 336 in FIG. 3.

The techniques described in association with FIG. 5 provide an example of the exemplary flow 700. For example, the first UE 102 may be the UE 102-1, the second UE 102 may be the UE 102-2 and the third UE 102 may be the UE 102-3 in FIG. 5. The same base station in blocks 702 and 704 may be the serving eNodeB 204 for UEs 102-1 and 102-2 in FIG. 5. The first plurality of RSTD measurements and the second plurality of RSTD measurements in blocks 702 and 704 may each comprise or include RSTD measurements for the serving eNodeB 204 and two other common eNodeBs 202 and 206 in FIG. 5. For example, the first plurality of RSTD measurements may comprise or include the first and second RSTDs described previously for FIG. 5 and the second plurality of RSTD measurements may comprise or include the third and fourth RSTDs described previously for FIG. 5. The apparatus 306 may employ the techniques described previously in association with Equations (4) to (7) to determine the at least one RTD at block 706. The at least one RTD determined at block 706 may be an RTD for eNodeBs 204 and 206, eNodeBs 204 and 202, or eNodeBs 202 and 206 in FIG. 5. The third plurality of RSTD measurements received at block 708 may comprise or include the fifth and sixth RSTDs described previously for FIG. 5. Determination of the position of the third UE 102 at block 708 may be as described for determination of the position of UE 102-3 in association with FIG. 5.

There are a number of benefits to the positioning methods described herein, such as in LTE in unlicensed spectrum deployment scenarios. For example, in 4G and 5G, there is a need for more data to more devices in more places. Thus, there is a strong need to leverage all spectrum types to meet data demands and Internet of Things (IoT) challenges. For example, in-building enterprises, small businesses, residential neighborhood, and venues such as indoor stadiums, airports, warehouses, etc. are some of the common deployment areas for LTE in unlicensed spectrum. Thus, LTE in unlicensed spectrum will probably play an important role for creating private and public 4G (and 5G) networks all around the world.

There are also a number of beneficial use cases for positioning in LTE in unlicensed spectrum. LTE in unlicensed spectrum is expected to be widely deployed in public and home scenarios for the upcoming 5G technology. Positioning has become an important need for many mobile applications. It is expected that there will be a large number of users with Internet connectivity via LTE in unlicensed spectrum in indoor scenarios where GPS is not accurate and OTDOA is a much better technology for position determination. Thus, the techniques for position determination described herein could be highly beneficial for such users.

As another use case, large warehouses are mostly indoor facilities, and as the world moves towards greater connectivity, these warehouses will likely become connected warehouses. LTE in unlicensed spectrum may be widely used to provide connectivity in such scenarios. In addition, drones will be used for automatic movement and navigation of items in these warehouses, thereby further increasing the benefits and use of the techniques described above.

Figure 8:
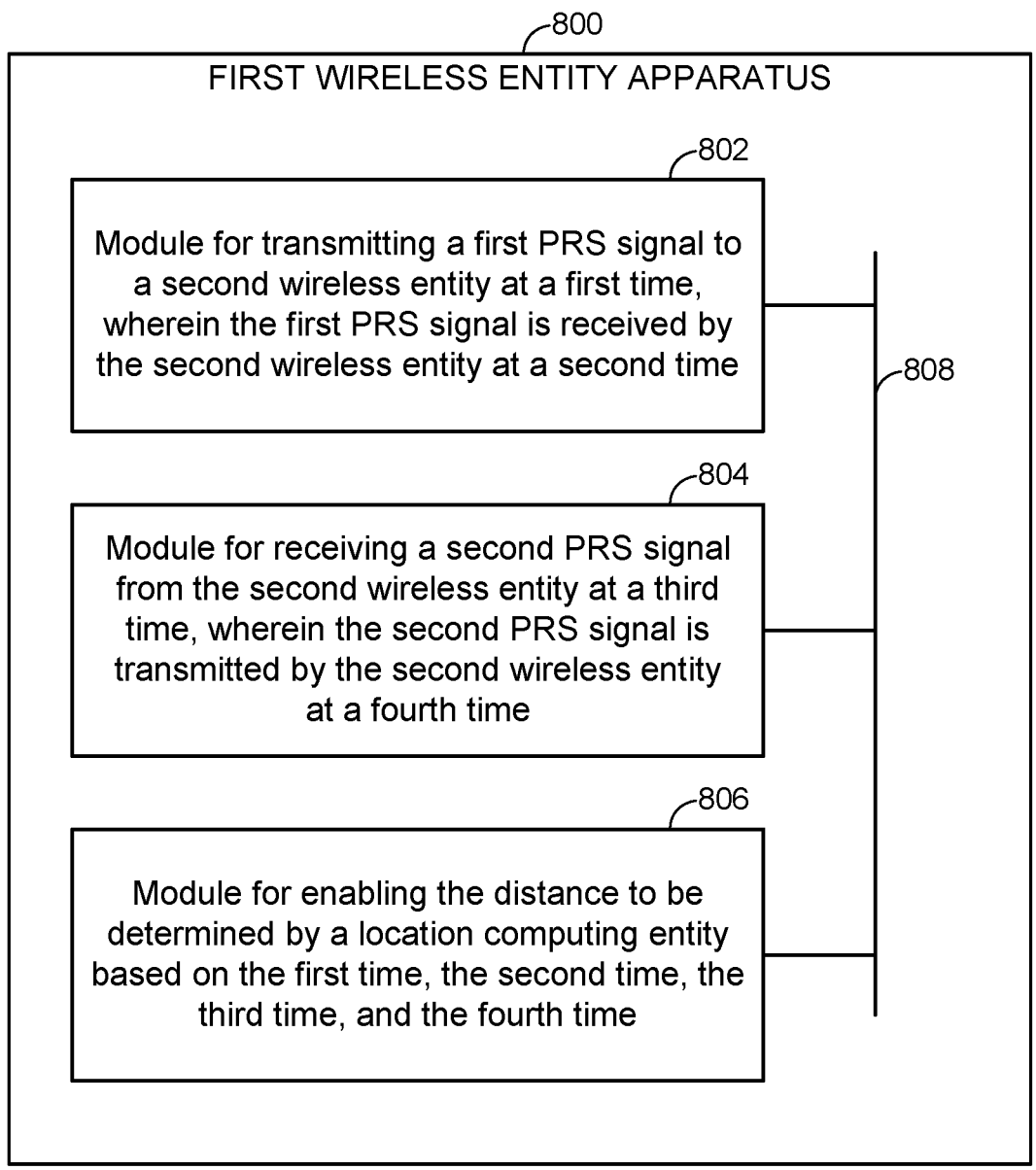
FIGS. 8 and 9 are other simplified block diagrams of several sample aspects of apparatuses configured to support positioning and communication as taught herein.

FIG. 8 illustrates an example first wireless entity apparatus 800 represented as a series of interrelated functional modules connected by a common bus 808. A module for transmitting 802 may correspond at least in some aspects to, for example, a communication device, such as communication device 308 or 314 in FIG. 3, and/or a processing system, such as processing system 332 or 334 in FIG. 3, as discussed herein. A module for receiving 804 may correspond at least in some aspects to, for example, a communication device, such as communication device 308 or 314 in FIG. 3, and/or a processing system, such as processing system 332 or 334 in FIG. 3, as discussed herein. A module for enabling 806 may correspond at least in some aspects to, for example, a processing system, such as processing system 332 or 334 in FIG. 3, and/or a communication device, such as communication device 308 or 314 in FIG. 3, as discussed herein.

Figure 9:
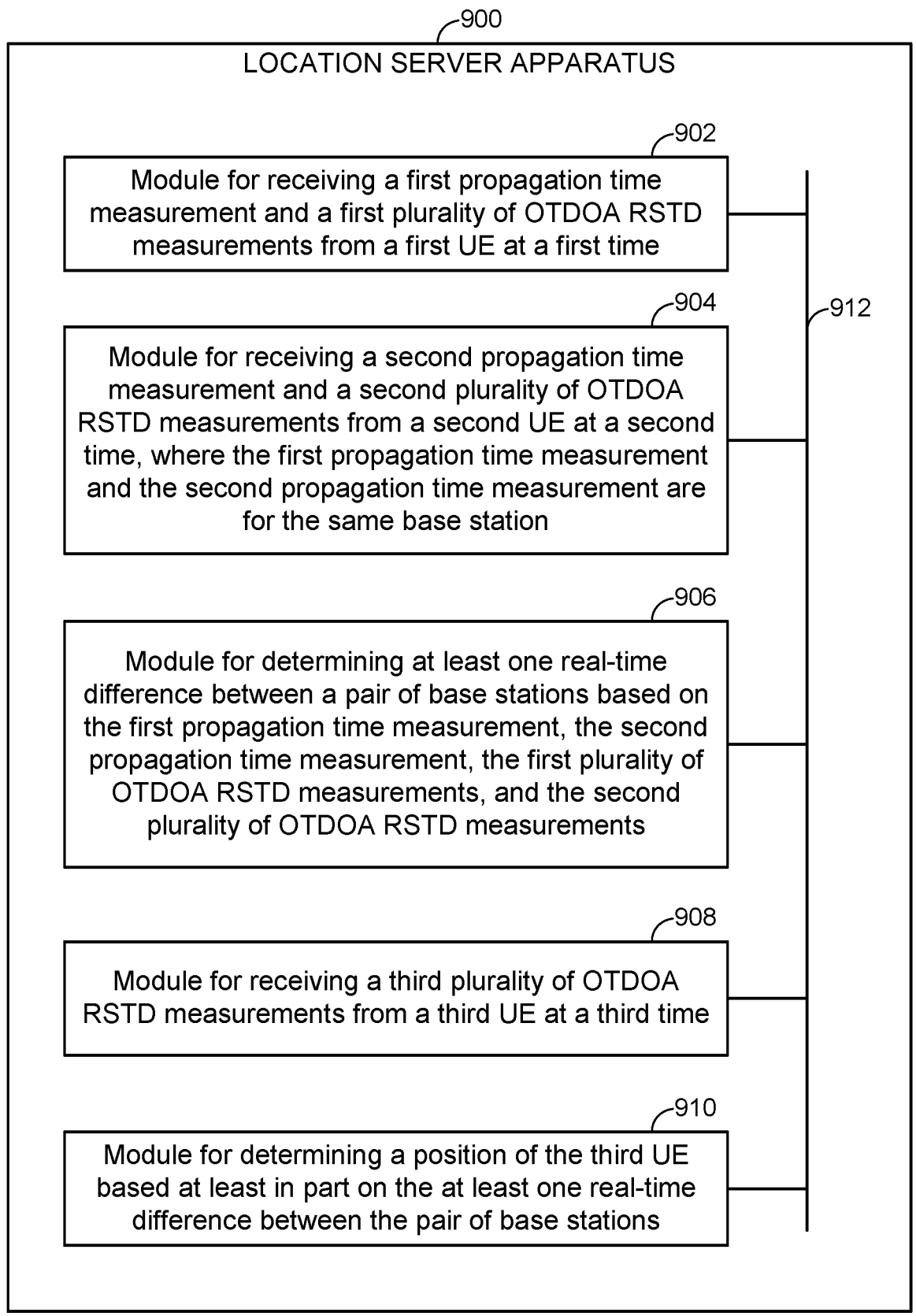

FIG. 9 illustrates an example location server apparatus 900 represented as a series of interrelated functional modules connected by a common bus 912. A module for receiving 902 may correspond at least in some aspects to, for example, a communication device, such as communication device 326 in FIG. 3, and/or a processing system, such as processing system 336 in FIG. 3, as discussed herein. A module for receiving 904 may correspond at least in some aspects to, for example, a communication device, such as communication device 326 in FIG. 3, and/or a processing system, such as processing system 336 in FIG. 3, as discussed herein. A module for determining 906 may correspond at least in some aspects to, for example, a processing system, such as processing system 336 in FIG. 3, as discussed herein. A module for receiving 908 may correspond at least in some aspects to, for example, a communication device, such as communication device 326 in FIG. 3, and/or a processing system, such as processing system 336 in FIG. 3, as discussed herein. A module for determining 910 may correspond at least in some aspects to, for example, a communication device, such as communication device 326 in FIG. 3, and/or a processing system, such as processing system 336 in FIG. 3, as discussed herein.

The functionality of the modules of FIGS. 8-9 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 8-9, as well as other components and functions described herein, may be implemented using any suitable means. Such means also may be implemented, at least in part, using corresponding structure as taught herein. For example, the components described above in conjunction with the "module for" components of FIGS. 8-9 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method at a user equipment (UE) for determining a distance from the UE to a base station, comprising:
    transmitting a first positioning reference signaling (PRS) signal to the base station at a first time, wherein the first PRS signal is received by the base station at a second time, and wherein the first time corresponds to the start of a first subframe of a cellular radio access technology (RAT) utilizing unlicensed radio frequency spectrum;
    receiving a second PRS signal from the base station at a third time, wherein the second PRS signal is transmitted by the base station at a fourth time, and wherein the fourth time corresponds to the start of a second subframe of the cellular RAT; and
    enabling the distance to be determined based on the first time, the second time, the third time, and the fourth time.

2. The method of claim 1, wherein the UE transmits the first PRS signal after winning contention of a shared wireless communications medium being utilized for the unlicensed radio frequency spectrum.

3. The method of claim 1, wherein the first time occurs before the third time.

4. The method of claim 1, wherein the first time occurs after the third time.

5. The method of claim 1, wherein the UE determines the distance from the UE to the base station.

6. The method of claim 1, wherein the base station determines the distance from the UE to the base station.

7. The method of claim 1, wherein a location server determines the distance from the UE to the base station.

8. The method of claim 7, wherein enabling the distance to be determined comprises sending the first time and the third time to the location server.

9. The method of claim 1, wherein a difference between the first time and the second time is less than half a duration of one subframe, and wherein a duration of one subframe is added to a difference between the first time and the third time based on a value of the difference between the first time and the third time minus a difference between the second time and the fourth time being negative.

10. The method of claim 1, wherein:
    the first subframe comprises one of a plurality of uplink subframes used by the UE for uplink communications to the base station and the second subframe comprises one of a plurality of downlink subframes used by the base station for downlink communications to the UE, and
    the plurality of uplink subframes and the plurality of downlink subframe are not synchronized with each other.

11. An apparatus for determining a distance from a user equipment (UE) to a base station, comprising:
    a transceiver of the UE configured to:
        transmit a first positioning reference signaling (PRS) signal to the base station at a first time, wherein the first PRS signal is received by the base station at a second time, and wherein the first time corresponds to the start of a first subframe of a cellular radio access technology (RAT) utilizing unlicensed radio frequency spectrum; and
        receive a second PRS signal from the base station at a third time, wherein the second PRS signal is transmitted by the base station at a fourth time, and wherein the fourth time corresponds to the start of a second subframe of the cellular RAT; and
    at least one processor of the UE configured to:
        enable the distance to be determined based on the first time, the second time, the third time, and the fourth time.

12. The apparatus of claim 11, wherein the transceiver transmits the first PRS signal after winning contention of a shared wireless communications medium being utilized for the unlicensed radio frequency spectrum.

13. The apparatus of claim 11, wherein the first time occurs before the third time.

14. The apparatus of claim 11, wherein the first time occurs after the third time.

15. The apparatus of claim 11, wherein the UE determines the distance from the UE to the base station.

16. The apparatus of claim 11, wherein the base station determines the distance from the UE to the base station.

17. The method of claim 11, wherein a location server determines the distance from the UE to the base station.

18. The method of claim 17, wherein the at least one processor being configured to enable the distance to be determined comprises the at least one processor being configured to cause the transceiver to send the first time and the third time to the location server.

19. The method of claim 11, wherein a difference between the first time and the second time is less than half a duration of one subframe, and wherein a duration of one subframe is added to a difference between the first time and the third time based on a value of the difference between the first time and the third time minus a difference between the second time and the fourth time being negative.

20. The method of claim 11, wherein:
the first subframe comprises one of a plurality of uplink subframes used by the UE for uplink communications to the base station and the second subframe comprises one of a plurality of downlink subframes used by the base station for downlink communications to the UE, and
the plurality of uplink subframes and the plurality of downlink subframe are not synchronized with each other.

21. A non-transitory computer-readable medium storing computer-executable instructions for determining a distance from a user equipment (UE) to a base station, the computer-executable instructions comprising:
at least one instruction instructing the UE to transmit a first positioning reference signaling (PRS) signal to the base station at a first time, wherein the first PRS signal is received by the base station at a second time, and wherein the first time corresponds to the start of a first subframe of a cellular radio access technology (RAT) utilizing unlicensed radio frequency spectrum;
at least one instruction instructing the UE to receive a second PRS signal from the base station at a third time, wherein the second PRS signal is transmitted by the base station at a fourth time, and wherein the fourth time corresponds to the start of a second subframe of the cellular RAT; and
at least one instruction instructing the UE to enable the distance to be determined based on the first time, the second time, the third time, and the fourth time.

22. The non-transitory computer-readable medium of claim 21, wherein the UE transmits the first PRS signal after winning contention of a shared wireless communications medium being utilized for the unlicensed radio frequency spectrum.

23. The non-transitory computer-readable medium of claim 21, wherein the first time occurs before the third time.

24. The non-transitory computer-readable medium of claim 21, wherein the first time occurs after the third time.

25. The non-transitory computer-readable medium of claim 21, wherein a difference between the first time and the second time is less than half a duration of one subframe, and wherein a duration of one subframe is added to a difference between the first time and the third time based on a value of the difference between the first time and the third time minus a difference between the second time and the fourth time being negative.

26. The non-transitory computer-readable medium of claim 21, wherein:
the first subframe comprises one of a plurality of uplink subframes used by the UE for uplink communications to the base station and the second subframe comprises one of a plurality of downlink subframes used by the base station for downlink communications to the UE, and
the plurality of uplink subframes and the plurality of downlink subframe are not synchronized with each other.

27. An apparatus for determining a distance from a user equipment (UE) to a base station, comprising:
a communication means of the UE configured to:
transmit a first positioning reference signaling (PRS) signal to the base station at a first time, wherein the first PRS signal is received by the base station at a second time, and wherein the first time corresponds to the start of a first subframe of a cellular radio access technology (RAT) utilizing unlicensed radio frequency spectrum; and
receive a second PRS signal from the base station at a third time, wherein the second PRS signal is transmitted by the base station at a fourth time, and wherein the fourth time corresponds to the start of a second subframe of the cellular RAT; and
a processing means of the UE configured to:
enable the distance to be determined based on the first time, the second time, the third time, and the fourth time.

28. The apparatus of claim 27, wherein the communication means transmits the first PRS signal after winning contention of a shared wireless communications medium being utilized for the unlicensed radio frequency spectrum.

29. The apparatus of claim 27, wherein the first time occurs before the third time.

30. The apparatus of claim 27, wherein the first time occurs after the third time.

* * * * *